US011943631B2

(12) United States Patent
Sun et al.

(10) Patent No.: US 11,943,631 B2
(45) Date of Patent: Mar. 26, 2024

(54) SPECTRUM DEVICE, WIRELESS COMMUNICATION SYSTEM, WIRELESS COMMUNICATION METHOD AND STORAGE MEDIUM

(71) Applicant: Sony Group Corporation, Tokyo (JP)

(72) Inventors: Chen Sun, Beijing (CN); Xin Guo, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 213 days.

(21) Appl. No.: 17/293,041

(22) PCT Filed: Dec. 20, 2019

(86) PCT No.: PCT/CN2019/126953
§ 371 (c)(1),
(2) Date: May 12, 2021

(87) PCT Pub. No.: WO2020/135250
PCT Pub. Date: Jul. 2, 2020

(65) Prior Publication Data
US 2021/0409963 A1    Dec. 30, 2021

(30) Foreign Application Priority Data
Dec. 29, 2018    (CN) .......................... 201811635753.4

(51) Int. Cl.
H04W 16/14    (2009.01)
H04W 16/10    (2009.01)
(52) U.S. Cl.
CPC ........... H04W 16/14 (2013.01); H04W 16/10 (2013.01)
(58) Field of Classification Search
CPC .............................. H04W 16/10; H04W 16/14
See application file for complete search history.

(56) References Cited

U.S. PATENT DOCUMENTS 11,166,165 B2 *  11/2021  Sun .................. H04W 16/10
2015/0087323 A1 *  3/2015  Srikanteswara ...... H04W 16/04
                                                                        455/452.1
(Continued)

FOREIGN PATENT DOCUMENTS

CA       3022270 A1    11/2017
CN      103687030 A     3/2014
(Continued)

OTHER PUBLICATIONS

International Search Report and Written Opinion dated Mar. 24, 2020, received for PCT Application No. PCT/CN2019/126953, Filed on Dec. 20, 2019, 9 pages including English Translation.

Primary Examiner — Dai Phuong
(74) Attorney, Agent, or Firm — XSENSUS LLP

(57) ABSTRACT

A spectrum coordination device is used in a wireless communication system that includes a first coexisting system and a second coexisting system, the first coexisting system comprises a spectrum coordination device and one or more sub-systems divided into coexisting groups, the second coexisting system comprises one or more sub-systems, and the spectrum coordination device includes a processing circuit, which is configured to generate spectrum modification information used for modifying spectrum resources of the sub-systems in the first coexistence system and/or for modifying spectrum resources of the sub-systems in the second coexistence system when coexistence management requirements of the first coexistence system are not satisfied. By using the spectrum device, wireless communication system, wireless communication method and storage medium according to the present disclosure, spectrum resources can be reasonably allocated to the sub-systems, so as to make more effective use of resources without mutual interference among the sub-systems.

20 Claims, 8 Drawing Sheets

(56) References Cited

U.S. PATENT DOCUMENTS

| | | | | |
|---|---|---|---|---|
| 2016/0056908 A1* | 2/2016 | Sun | ................... | H04W 72/0453 |
| | | | | 370/329 |
| 2016/0088485 A1* | 3/2016 | Guo | ..................... | H04W 16/14 |
| | | | | 370/329 |
| 2018/0242165 A1 | 8/2018 | Macmullan et al. | | |
| 2019/0215698 A1* | 7/2019 | Balachandran | ....... | H04W 28/26 |

FOREIGN PATENT DOCUMENTS

| | | | |
|---|---|---|---|
| CN | 105704822 A | 6/2016 | |
| CN | 107371165 A | 11/2017 | |
| CN | 107396369 A | 11/2017 | |
| CN | 108702627 A | 10/2018 | |
| CN | 111385802 A | 7/2020 | |
| WO | WO-2011105059 A1 | 9/2011 | |
| WO | WO-2015158125 A1 | 10/2015 | |
| WO | WO-2017195152 A1 | 11/2017 | |
| WO | WO-2018223983 A1 | 12/2018 | |

* cited by examiner

SPECTRUM DEVICE, WIRELESS COMMUNICATION SYSTEM, WIRELESS COMMUNICATION METHOD AND STORAGE MEDIUM

CROSS-REFERENCE TO RELATED APPLICATIONS

The present application is based on PCT filing PCT/CN2019/126953, filed Dec. 20, 2019, which claims priority to Chinese Patent Application No. 201811635753.4, titled "SPECTRUM DEVICE, WIRELESS COMMUNICATION SYSTEM, WIRELESS COMMUNICATION METHOD AND STORAGE MEDIUM", filed on Dec. 29, 2018 with the Chinese Patent Office, each of which is incorporated herein by reference in its entirety.

FIELD

Embodiments of the present disclosure generally relate to the technical field of wireless communications, and in particular to a spectrum device, a wireless communication system, a wireless communication method and a storage medium. More specifically, the present disclosure relates to a spectrum coordination device in a wireless communication system, a spectrum division device in a wireless communication system, a spectrum authorization device in a wireless communication system, a wireless communication system, a wireless communication method performed by a spectrum coordination device in a wireless communication system, a wireless communication method performed by a spectrum division device in a wireless communication system, a wireless communication method performed by a spectrum authorization device in a wireless communication system as well as a computer readable storage medium.

BACKGROUND

With the development of wireless communication systems, users have increasingly high demands for services having high quality, high-speed and new services. Operators and device manufacturers are required to continually improve the system to meet user demands. Therefore, a large number of spectrum resources are required. However, limited spectrum resources are allocated to fixed operators and services, and a new available spectrum is very scarce and expensive. In this case, a concept of dynamic spectrum utilization is proposed, that is, spectrum resources which have been allocated to certain services but are not utilized sufficiently are utilized dynamically. For example, a spectrum of a channel on which there is no program on a digital television broadcast spectrum may be dynamically used to perform wireless mobile communication without interfering with reception of a television signal.

In this application example, since the television broadcast spectrum is allocated to a television broadcast system, the television broadcast system is a primary system, and a television is a primary user. A mobile communication system may be referred to as a secondary system, and a user in the mobile communication system may be referred to as a secondary user. That is, a primary system may be a system that has a right to use a spectrum. A user in the primary system may be referred to as a primary user. A secondary system may be a system that has no right to use a spectrum and only properly uses the spectrum when a primary system to which the spectrum is allocated does not use the spectrum. In addition, both the primary system and the secondary system may have the spectrum usage right, but they have different priority levels in using the spectrum.

When the secondary system needs to use spectrum resources, it is required to access a spectrum management device. The spectrum management device assumes that the secondary system may use spectrum resources on any of frequency bands, and thus calculates the maximum transmission power based on interference to the primary system caused by the secondary system using spectrum resources on any of the frequency bands. However, because the secondary system may use spectrum resources in any of frequency bands, and different spectrum management devices relatively independently allocate spectrum resources to the secondary system managed by different spectrum management devices, global optimization is not considered, thereby resulting in interferences between secondary systems and reducing the spectrum efficiency. For example, in a case that multiple secondary systems occupy a certain frequency band, the frequency band may not be able to accommodate new secondary system. For another example, in a case that multiple secondary systems occupy discrete frequency bands, other secondary systems may not be able to obtain continuous spectrum resources.

Therefore, it is required to propose a technical solution to reasonably allocate spectrum resources to the secondary system, such that secondary systems can more effectively use resources without interfering with each other.

SUMMARY

This summary section provides a general summary of the present disclosure, rather than a comprehensive disclosure of full scope or features of the present disclosure.

An object of the present disclosure is to provide a spectrum device, a wireless communication system, a wireless communication method and a storage medium, to reasonably allocate spectrum resources to a secondary system, such that secondary systems can effectively use resources without interfering with each other.

According to an aspect of the present disclosure, a spectrum coordination device in a wireless communication system is provided. The wireless communication system includes a first coexistence system and a second coexistence system, the first coexistence system includes the spectrum coordination device and one or more secondary systems divided into coexistence groups, the second coexistence system includes one or more secondary systems, the spectrum coordination device includes a processing circuitry configured to: generate, in a case where a coexistence management requirement of the first coexistence system is not satisfied, spectrum modification information for modifying spectrum resource of a secondary system in the first coexistence system and/or for modifying spectrum resource of the a secondary system in the second coexistence system.

According to an aspect of the present disclosure, a spectrum division device in a wireless communication system is provided. The wireless communication system includes a first coexistence system, the first coexistence system includes a spectrum coordination device, the spectrum division device and one or more secondary systems divided into coexistence groups, the spectrum division device includes a processing circuitry configured to: determine whether transmission power of the one or more secondary systems in the coexistence groups managed by the spectrum division device satisfies a coexistence management requirement of the first coexistence system; and send, in a case where the transmission power of the one or more secondary systems does not satisfy the coexistence management requirement of the first coexistence system, a spectrum usage report to the spectrum coordination device.

According to an aspect of the present disclosure, a spectrum authorization device in a wireless communication system is provided. The wireless communication system includes a first coexistence system and a second coexistence system, the first coexistence system includes a spectrum coordination device and one or more secondary systems, the second coexistence system includes the spectrum authorization device and one or more secondary systems, the spectrum authorization includes a processing circuitry configured to: receive spectrum modification information from the spectrum coordination device; and modify spectrum resources of a secondary system in the second coexistence system according to the spectrum modification information.

According to another aspect of the present disclosure, a wireless communication system is provided. The wireless communication system includes: a first coexistence system, including: one or more secondary systems divided into coexistence groups; and a spectrum coordination device configured to allocate spectrum resources to the coexistence groups in the first coexistence system according to usable spectrum resources of the first coexistence system; and a second coexistence system, including: one or more secondary systems; and a spectrum authorization device configured to allocate spectrum resources to a secondary system in the second coexistence system according to usable spectrum resources of the second coexistence system, where the spectrum coordination device is configured to generate, in a case where a coexistence management requirement of the first coexistence system is not satisfied, spectrum modification information for modifying spectrum resource of the secondary system in the second coexistence system, and where the spectrum authorization device is configured to receive spectrum modification information from the spectrum coordination device; and modify spectrum resources of the secondary system in the second coexistence system according to the spectrum modification information.

According to another aspect of the present disclosure, a wireless communication method performed by a spectrum coordination device in a wireless communication system is provided. The wireless communication system includes a first coexistence system and a second coexistence system, the first coexistence system includes the spectrum coordination device and one or more secondary systems divided into coexistence groups, the second coexistence system includes one or more secondary systems, the wireless communication method includes: generating, in a case where a coexistence management requirement of the first coexistence system is not satisfied, spectrum modification information for modifying spectrum resource of a secondary system in the first coexistence system and/or for modifying spectrum resource of the a secondary system in the second coexistence system.

According to another aspect of the present disclosure, a wireless communication method performed by a spectrum division device in a wireless communication system is provided. The wireless communication system includes a first coexistence system, the first coexistence system includes a spectrum coordination device, the spectrum division device and one or more secondary systems divided into coexistence groups, the wireless communication method includes: determining whether transmission power of the one or more secondary systems in the coexistence groups managed by the spectrum division device satisfies a coexistence management requirement of the first coexistence system; and sending, in a case where the transmission power of the one or more secondary systems does not satisfy the coexistence management requirement of the first coexistence system, a spectrum usage report to the spectrum coordination device.

According to another aspect of the present disclosure, a wireless communication method performed by a spectrum authorization device in a wireless communication system is provided. The wireless communication system includes a first coexistence system and a second coexistence system, the first coexistence system includes a spectrum coordination device and one or more secondary systems, the second coexistence system includes the spectrum authorization device and one or more secondary systems, the wireless communication method includes: receiving spectrum modification information from the spectrum coordination device; and modifying spectrum resources of a secondary system in the second coexistence system according to the spectrum modification information.

According to another aspect of the present disclosure, a computer readable storage medium including executable computer instructions is provided. The executable computer instructions, when being executed by a computer, cause the computer to perform the wireless communication method according to the present disclosure.

With the spectrum device, the wireless communication system, the wireless communication method and the storage medium according to the present disclosure, in a case that the coexistence management requirement of the first coexistence system is not satisfied, the spectrum coordination device in the first coexistence system may generate the spectrum modification information for modifying spectrum resource of a secondary system in the first coexistence system and/or for modifying spectrum resource of the a secondary system in the other coexistence system. In this way, when allocating spectrum resources to the secondary system in the coexistence system, the spectrum resources of the secondary system in other coexisting system may be considered, such that coordination between different coexistence systems is possible, thereby allocating reasonably spectrum resources to secondary systems, and thus, secondary systems can effectively use resources without interfering with each other.

From the description provided herein, further applicability areas will become apparent. The description and specific examples in the summary are only schematic, rather than limiting the scope of the present disclosure.

BRIEF DESCRIPTION OF THE DRAWINGS

The drawings described herein are for illustrative purposes only of preferred embodiments rather than all possible embodiments, and are not intended to limit the scope of the present disclosure. In the drawing.

Figure 1:
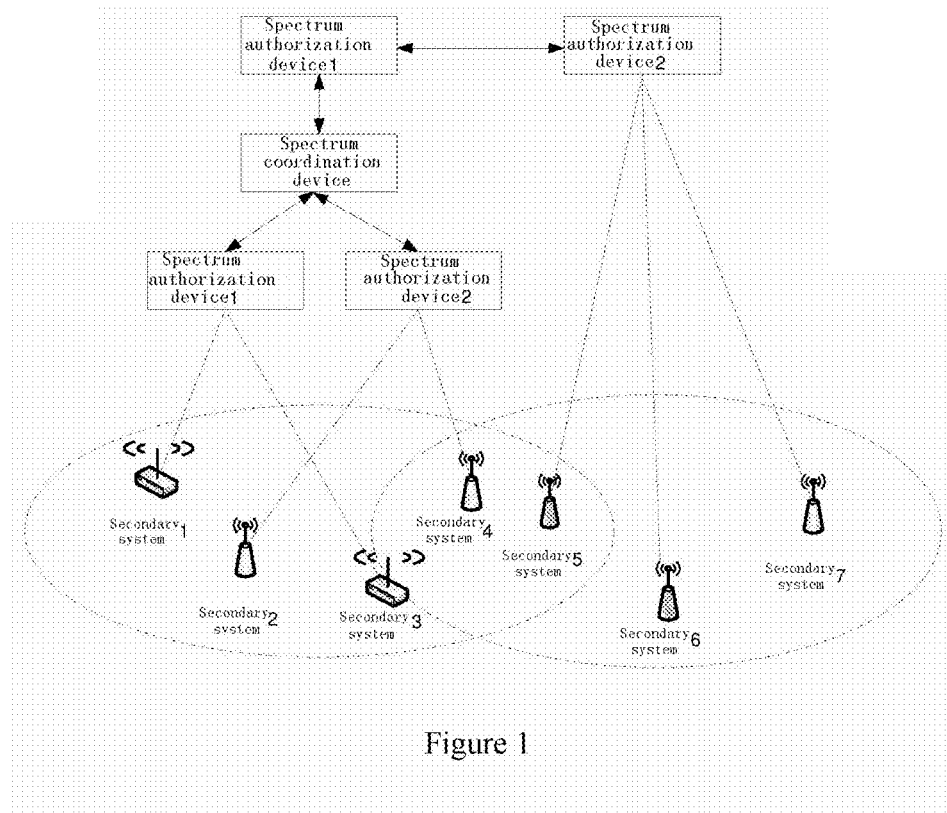
FIG. 1 is a schematic diagram showing an application scenario according to an embodiment of the present disclosure.

Although the present disclosure is susceptible to various modifications and alternative forms, specific embodiments thereof have been shown in the drawings as examples and are described in detail herein. It should be understood that description for the specific embodiments is not intended to limit the present disclosure into a disclosed specific form, and the present disclosure aims to cover all modification, equivalents and alternations falling within the spirit and scope of the present disclosure. It is noted that throughout the several figures, corresponding reference numerals indicate corresponding parts.

DETAILED DESCRIPTION OF EMBODIMENTS

Examples of the present disclosure are fully described with reference to the drawings. The following description is merely exemplary rather than being intended to limit the present disclosure and applications or purposes of the present disclosure.

The exemplary embodiments are provided such that the present disclosure will become thorough, and will convey the scope thereof fully to those skilled in the art. Examples of numerous specific details, such as specific components, devices, and methods, are set forth to provide a thorough understanding of the embodiments of the present disclosure. It will be apparent to those skilled in the art that exemplary embodiments may be implemented in many different forms without the use of specific details, and exemplary embodiments should not be construed as limiting the scope of the present disclosure. In some exemplary embodiments, well-known processes, well-known structures, and well-known technologies are not described in detail.

Description is made in the following order:
1. Description of a scenario
2. Example of a configuration of a spectrum coordination device
3. Example of a configuration of a spectrum division device
4. Example of a configuration of a spectrum authorization device
5. Example of a configuration of a wireless communication system
6. Method embodiment
7. Application example 1. Description of a Scenario FIG. 1 is a schematic diagram showing an application scenario according to an embodiment of the present disclosure. In the scenario shown in FIG. 1, two spectrum authorization devices are shown, namely, a spectrum authorization device 1 and a spectrum authorization device 2. A coexistence system in which the spectrum authorization device 1 is located (hereinafter simply referred to as the coexistence system 1) also includes a spectrum coordination device and two spectrum division devices, namely, a spectrum division device 1 and a spectrum division device 2. In addition, the coexistence system 1 also includes four secondary systems, namely, a secondary system 1, a secondary system 2, a secondary system 3, and a secondary system 4. Here, the secondary system 1 and the secondary system 3 are managed by the spectrum division device 1, and thus, the secondary system 1 and the secondary system 2 are referred to as a coexistence group. The secondary system 2 and the secondary system 4 are managed by the spectrum division device 2, and thus, the secondary system 2 and the secondary system 4 are referred to as a coexistence group. Further, a coexistence system in which the spectrum authorization device 2 is located (hereinafter simply referred to as the coexistence system 2) includes three secondary systems, namely, a secondary system 5, a secondary system 6 and a secondary system 7.

In the coexistence system 1 shown in FIG. 1, the spectrum authorization device 1 may determine usable spectrum resources of a secondary system in the coexistence system 1 according to the information such as the spectrum usage of the primary system, the location of the primary system, the location of the secondary system and the like. The spectrum coordination device coordinates spectrum resources between the coexistence group 1 and the coexistence group 2 based on usable spectrum resources from the spectrum authorization device 1, to avoid interference between the secondary systems in the coexistence group 1 and the coexistence group 2. For example, it is assumed that the usable spectrum resources determined by the spectrum authorization device 1 include 4 frequency bands, namely, CH1, CH2, CH3, and CH4, the spectrum coordination device may allocate CH1 and CH2 to the coexistence group 1 and allocate CH3 and CH4 to the coexistence group 2. The spectrum division device may adjust the spectrum usage of the secondary system within the range of the usable spectrum resources from the spectrum coordination device. For example, the spectrum division device 1 allocates CH1 to the secondary system 1, allocates CH2 to the secondary system 3, and the spectrum division device 2 allocates CH3 to the secondary system 2, and allocates CH4 to the secondary system 4. In the coexistence system 2 shown in FIG. 1, there is no spectrum coordination device and spectrum division device. Therefore, the spectrum authorization device 2 may determine the usable spectrum resources of the secondary system in the coexistence system 2 based on the information such as the spectrum usage of the primary system, the location of the primary system, and the location of the secondary system and the like. For example, the spectrum authorization device 2 allocates CH4 to the secondary system 5, allocates CH1 to the secondary system 6, and allocates CH3 to the secondary system 7.

In the scenario shown in FIG. 1, since there is no coordination between the coexistence system 1 and the coexistence system 2, the coexistence system 1 and the coexistence system 2 allocate spectrum resources to the secondary systems relatively independently. From the perspective of geographical location, the secondary system 4 and the secondary system 5 are relatively close and belong to different coexistence systems. Therefore, both the secondary system 4 and the secondary system 5 may use CH4, such that transmission power is small when the secondary system 4 uses CH4, which cannot satisfy the coexistence management requirement of the coexistence system 1. Furthermore, the spectrum coordination device allocates continuous spectrum resources to a coexistence group when allocating spectrum resources to the coexistence groups. For example, the spectrum coordination device may allocate CH1 and CH2 to the coexistence group 1, but not allocate CH1 and CH3 to the coexistence group 1. In a case that the secondary system 5 uses CH4, the secondary system 6 uses CH1, and the secondary system 7 uses CH3, since multiple secondary systems in the coexistence group 2 occupy the spectrum resources in a dispersed manner, the spectrum coordination device may not allocate continuous spectrum resources to a coexistence group, such that the coexistence management requirement of the coexistence system 1 cannot be satisfied.

According to the present disclosure, for such scenario, a spectrum coordination device in a wireless communication system, a spectrum division device in a wireless communication system, a spectrum authorization device in a wireless communication system, a wireless communication system, and a wireless communication method performed by the spectrum coordination device in the wireless communication system, a wireless communication method performed by the spectrum division device in the wireless communication system, a wireless communication method performed by the spectrum authorization device in the wireless communication system as well as a computer readable storage medium are proposed, such that the coordination between different coexisting systems is possible, thereby reasonably allocating spectrum resources to the secondary systems, and thus, secondary systems can effectively use resources without interfering with each other.

It is worth noting that FIG. 1 is only an example of the application scenario according to the present disclosure. In an actual scenario, the number of coexistence system, the number of spectrum division device, the number of secondary system in each of coexistence groups and the like may all have other values. That is, the present disclosure is applicable to any wireless communication system including a primary system and a secondary system. Furthermore, for ease of description, the primary system and a primary user are not shown in FIG. 1.

The wireless communication system according to the present disclosure may be a 5G NR (new radio) communication system.

The spectrum authorization device according to the present disclosure may be a SAS (Spectrum Access System). The SAS may determine the spectrum range that may be used by the secondary system based on the information such as the spectrum usage of the primary system, the location of the primary system, and the location of the secondary system and the like. The SAS may be a spectrum management device determined according to a geographic location, and each SAS may manage secondary systems in a certain area. For example, the SAS may be a spectrum allocation function module provided by a geographic location database operator authorized according to national regulations.

The spectrum coordination device according to the present disclosure may be a GSC (General Authorized Access (GAA) Spectrum Coordination) device. The GSC device may be a spectrum management device that coordinates spectrums between coexistence groups managed by multiple spectrum division devices based on usable spectrum resources from the SAS, to avoid interference between secondary systems managed by different spectrum division devices.

The spectrum division device according to the present disclosure may be a C×M (Coexistence Manager). The C×M may be a spectrum management device that adjusts the spectrum usage of the secondary system within the range of usable spectrum resources from the GSC. Each C×M manages a CSG (Coexistence Group), and a CSG may include one or more secondary systems. For example, the C×M may be different operators or network providers, or may be a network management organization in a certain office area, residential area or university campus.

The secondary system according to the present disclosure may be a CBSD (Citizens Broadband Radio Service Device). The CBSD may be a network side device, such as any type of TRP (Transmit and Receive Port) and a base station device, for example, may be an eNB or a gNB (a base station in the 5th generation communication system).

Figure 2:
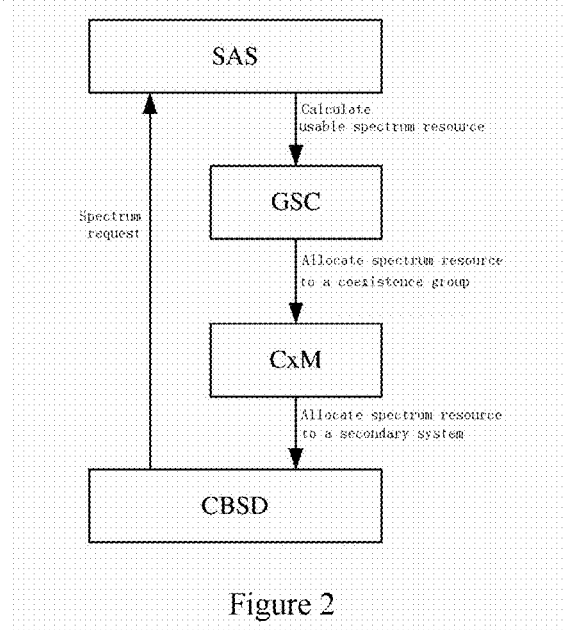
FIG. 2 is a schematic diagram showing an architecture of a wireless communication system according to an embodiment of the present disclosure.

FIG. 2 is a schematic diagram showing an architecture of a wireless communication system according to an embodiment of the present disclosure. As shown in FIG. 2, the coexistence systems in the wireless communication system include a SAS, a GSC, a C×M and a CBSD. When the CBSD needs to use spectrum resources, the CBSD sends a spectrum usage request to SAS. The SAS determines the spectrums that may be used by the secondary system according to the spectrum usage of the primary system, and sends the calculated usable spectrum to the GSC. Next, the GSC coordinates the spectrums between coexistence groups managed by the multiple C×M based on the usable spectrum resources from the SAS, and sends the spectrum resources allocated to the C×M to the corresponding C×M. Next, the C×M adjusts the spectrum usage of the secondary system within the range of usable spectrum resources from the GSC, to allocate spectrum resource to the CBSD. FIG. 2 shows a situation where the coexistence system includes a GSC and a C×M. In actual scenarios, some coexistence systems may not include a GSC and a C×M. In this case, when the CBSD needs to use spectrum resources, the CBSD sends a spectrum usage request to the SAS, and the SAS determines the spectrums that may be used by the secondary system according to the spectrum usage of the primary system, and sends the calculated usable spectrum to the CBSD.

According to an embodiment of the present disclosure, for ease of description, a system composed of a spectrum management device and a secondary system within the coverage of a spectrum authorization device is referred to as a coexistence system. In other words, the coexistence system may include one spectrum authorization device and one or more secondary systems. Optionally, the coexistence system may further include a spectrum coordination device and/or one or more spectrum division devices. Furthermore, according to an embodiment of the present disclosure, the spectrum coordination device may be separated from the spectrum authorization device, or may be integrated into the spectrum authorization device.

2. Example of a Configuration of a Spectrum Coordination Device

Figure 3:
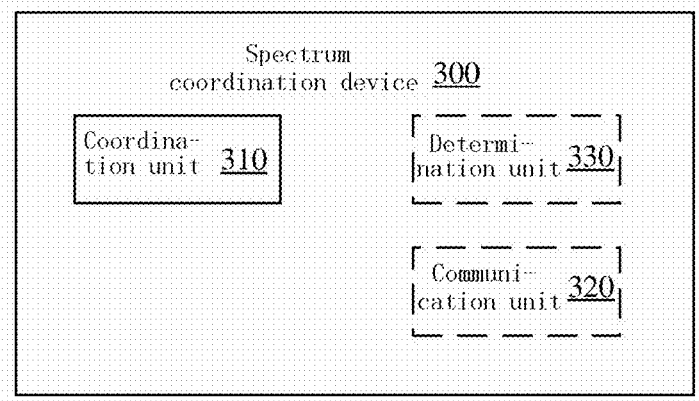
FIG. 3 is a block diagram showing an example of a configuration of a spectrum coordination device according to an embodiment of the present disclosure.

FIG. 3 is a block diagram showing an example of a configuration of a spectrum coordination device 300 according to an embodiment of the present disclosure. The spectrum coordination device 300 here may be, for example, a GSC. Furthermore, the spectrum coordination device 300 may be applied to a wireless communication system. The wireless communication system includes a first coexistence system and a second coexistence system. The first coexistence system includes the spectrum coordination device 300 and one or more secondary systems divided into coexistence groups, and the second coexistence system includes one or more secondary systems.

As shown in FIG. 3, the spectrum coordination device 300 may include a coordination unit 310.

Here, all units of the spectrum coordination device 300 may be included in a processing circuitry. It should be noted that the spectrum coordination device 300 may include one processing circuitry or multiple processing circuitries. Further, the processing circuitry may include various discrete functional units to perform different functions and/or operations. It should be noted that these functional units may be physical entities or logical entities, and units with different names may be implemented by the same physical entity.

According to an embodiment of the present disclosure, the coordination unit 310 of the spectrum coordination device 300 may generate, in a case where a coexistence management requirement of the first coexistence system is not satisfied, spectrum modification information for modifying spectrum resource of a secondary system in the first coexistence system and/or for modifying spectrum resource of the a secondary system in the second coexistence system.

According to an embodiment of the present disclosure, the coexistence management requirement of the coexistence system represents a requirement for the secondary system in the coexistence system to be able to work normally, which may include requirements from multiple aspects. In one example, the coexistence management requirement may include the ability to allocate usable spectrum resources to the secondary system. For example, the coexistence management requirement includes allocating continuous spectrum resources for multiple secondary systems in a coexistence group. In another example, the coexistence management requirement may include the ability to allocate sufficient spectrum resources for the secondary system. For example, the coexistence management requirement includes that when the secondary system reuses the allocated spectrum resources, the transmission power should reach a predetermined threshold. Of course, the coexistence management requirement may also include other coexistence management requirements.

According to an embodiment of the present disclosure, in a case that the coexistence management requirement of the first coexistence system is not satisfied, it may be indicated with a high probability that the secondary system in the first coexistence system may not be allocated usable and sufficient spectrum resources, which may be caused by the lack of coordination between different coexistence systems. Therefore, according to an embodiment of the present disclosure, the spectrum coordination device 300 may generate spectrum modification information for modifying spectrum resource of a secondary system in the first coexistence system and/or for modifying spectrum resource of the a secondary system in the second coexistence system. That is, by modifying the spectrum resources of the secondary system in the first coexistence system and/or modifying the spectrum resources of the secondary system in the second coexistence system, the coexistence management requirement of the first coexistence system is satisfied.

It can be seen that the spectrum coordination device 300 according to an embodiment of the present disclosure may generate, in a case where a coexistence management requirement of the first coexistence system is not satisfied, spectrum modification information for modifying spectrum resource of a secondary system in the first coexistence system and/or for modifying spectrum resource of the a secondary system in the other coexistence system may be generated. In this way, when allocating spectrum resources to the secondary systems in the coexistence system, the spectrum resources of the secondary systems in other coexistence systems may be considered, such that coordination between different coexistence systems is possible, thereby reasonably allocating spectrum resources to the secondary systems, and thus, secondary systems can effectively use resources without interfering with each other.

As shown in FIG. 3, according to an embodiment of the present disclosure, the spectrum coordination device 300 may further include a communication unit 320 configured to communicate with devices other than the spectrum coordination device 300.

According to an embodiment of the present disclosure, the spectrum coordination device 300 may receive a spectrum usage report from one or more spectrum division devices in the first coexistence system via the communication unit 320.

According to an embodiment of the present disclosure, the coordination unit 310 may determine, according to the spectrum usage report, whether the coexistence management requirement of the first coexistence system is satisfied.

According to an embodiment of the present disclosure, the coordination unit 310 may determine frequency bands that do not satisfy the coexistence management requirement of the first coexistence system according to the spectrum usage report. That is, the spectrum usage report received from the spectrum division device includes frequency bands that do not satisfy the coexistence management requirement of the first coexistence system. For example, the spectrum usage report may include identification information on frequency bands that do not satisfy the coexistence management requirement of the first coexistence system.

As described above, according to an embodiment of the present disclosure, the spectrum division device in the first coexistence system may determine that the coexistence management requirement of the first coexistence system is not satisfied, such that the spectrum coordination device 300 determine that the coexistence management requirement of the first coexistence system is not satisfied based on the spectrum usage report from the spectrum division device.

As shown in FIG. 3, according to an embodiment of the present disclosure, the spectrum coordination device 300 may further include a determination unit 330 configured to determine whether the coexistence management requirement of the first coexistence system is satisfied.

According to an embodiment of the present disclosure, the determination unit 330 may determine a continuity of the usable spectrum resources of the first coexistence system, that is, a consecutive usage period of time, and determine, in a case where a continuity requirement with respect to frequency bands of one coexistence group is not satisfied, that the coexistence management requirement of the first coexistence system is not satisfied.

According to an embodiment of the present disclosure, when allocating spectrum resources to different spectrum division devices, the spectrum coordination device 300 needs to allocate continuous spectrum resources to the coexistence group managed by one spectrum division device. Therefore, the determination unit 330 of the spectrum coordination device 300 needs to determine the continuity of the currently usable spectrum resources. Here, the determination unit 330 may obtain the currently usable spectrum resource from the spectrum authorization device in the first coexistence system, to determine the continuity of the currently usable spectrum resources. According to an embodiment of the present disclosure, since the spectrum authorization device has considered the usage of spectrum resources of the secondary system managed by other spectrum authorization devices when determining the usable spectrum resources, which may be implemented through communication with other spectrum authorization devices, the usable spectrum resources obtained by the spectrum coordination device 300 actually reflect the usage of spectrum resources of the secondary systems in the entire wireless communication system. Therefore, in a case that the continuity requirement for the frequency bands of a coexistence group is not satisfied, the determination unit 330 may determine that the coexistence management requirement of the first coexistence system is not satisfied.

For example, when both CH2 and CH4 are occupied by a secondary system in other coexistence system, the spectrum coordination device 300 may not allocate two consecutive frequency bands to the coexistence group (assuming that two frequency bands need to be allocated to the coexistence group), and the determination unit 330 may determine that the coexistence management requirement of the first coexistence system is not satisfied. For another example, when CH2 is occupied by a secondary system of other coexistence system, although the spectrum coordination device 300 may allocate two consecutive frequency bands CH3 and CH4 to the coexistence group (assuming that two frequency bands need to be allocated to the coexistence group), there is a potential risk that the coexistence management requirement of the first coexistence system is not satisfied. In this case, the determination unit 330 may also determine that the coexistence management requirement of the first coexistence system is not satisfied. That is, the coexistence management requirement of the first coexistence system includes a continuity requirement for the frequency bands of a coexistence group. When the continuity requirement for the frequency bands of a coexistence group is not satisfied, the determination unit 330 may determine that the coexistence management requirement of the first coexistence system is not satisfied.

According to an embodiment of the present disclosure, the determination unit 330 may also determine a frequency band that does not satisfy the coexistence management requirement of the first coexistence system according to the continuity of usable spectrum resources. Here, the determination unit 330 may determine a frequency band in the frequency band occupied by the secondary system in the other coexistence system that has caused or is about to cause the continuity requirement for the frequency band of a coexistence group to be not satisfied as a frequency band that does not satisfy the coexistence management requirement of the first coexistence system.

The previous embodiment is taken as an example. When both CH2 and CH4 are occupied by a secondary system of other coexistence system, the spectrum coordination device 300 may not allocate two consecutive frequency bands to the coexistence group (assuming that two frequency bands need to be allocated to the coexistence group). In this case, the determination unit 330 may determine CH2 and CH4 as frequency bands that do not satisfy the coexistence management requirement of the first coexistence system. For another example, when CH2 is occupied by a secondary system of other coexistence system, although the spectrum coordination device 300 may allocate two consecutive frequency bands CH3 and CH4 to the coexistence group (assuming that two frequency bands need to be allocated to the coexistence group), there is a potential risk that the coexistence management requirement of the first coexistence system is not satisfied. In this case, the determination unit 330 may determine CH2 as a frequency band that does not satisfy the coexistence management requirement of the first coexistence system.

As described above, according to an embodiment of the present disclosure, the spectrum coordination device 300 in the first coexistence system may determine that the coexistence management requirement of the first coexistence system is not satisfied.

According to an embodiment of the present disclosure, in a case that the coexistence management requirement of the first coexistence system is not satisfied, the coordination unit 310 may generate at least one of the following: the spectrum modification information for modifying the spectrum resource of the secondary system in the first coexistence system; and the spectrum modification information for modifying the spectrum resource of the secondary system in the second coexistence system.

According to an embodiment of the present disclosure, the spectrum modification information for modifying the spectrum resource of the secondary system in the first coexistence system generated by the coordination unit 310 may include: allocating, to the coexistence group in the first coexistence system, frequency bands in the usable spectrum resources of the first coexistence system except the frequency bands which do not satisfy the coexistence management requirement. In other words, the spectrum modification information for modifying the spectrum resource of the secondary system in the first coexistence system may include: allocating, to the coexistence groups in the first coexistence system, frequency bands in the usable spectrum resources of the first coexistence system which satisfy the coexistence management requirement.

That is, when allocating spectrum resources of the coexistence group to the spectrum division device in the first coexistence system, the coordination unit 310 may allocate frequency bands in the usable spectrum resources of the first coexistence system except the frequency bands which do not satisfy the coexistence management requirement. Here, the spectrum coordination device 300 may obtain the usable spectrum resources of the first coexistence system from the spectrum authorization device in the first coexistence system. For example, when CH1 to CH4 are usable spectrum resources of the first coexistence system and CH3 is a frequency band that does not satisfy the coexistence management requirement, the spectrum coordination device 300 may allocate CH1, CH2, and CH4 to the secondary system of the first coexistence system. At this time, CH1, CH2, and CH4 are frequency bands that satisfy the coexistence management requirement.

As described above, according to an embodiment of the present disclosure, in a case that the coexistence management requirement of the first coexistence system is not satisfied, the spectrum coordination device 300 may modify the spectrum resource of the secondary system in the first coexistence system, to avoid interference with the secondary system in other coexistence system.

According to an embodiment of the present disclosure, the spectrum modification information for modifying the spectrum resource of the secondary system in the second coexistence system generated by the coordination unit 310 may include: allocating, to the secondary system in the second coexistence system, frequency bands in the usable spectrum resources of the second coexistence system except the frequency bands which do not satisfy the coexistence management requirement.

Here, the spectrum coordination device 300 may obtain the usable spectrum resources of the second coexistence system from the spectrum authorization device in the second coexistence system (for ease of distinction, the spectrum authorization device in the first coexistence system is referred to as the first spectrum authorization device and the spectrum authorization device in the second coexistence system is referred to as the second spectrum authorization device). For example, the spectrum coordination device 300 may obtain the usable spectrum resources of the second coexistence system from the spectrum authorization device in the second coexistence system through the spectrum authorization device in the first coexistence system, thereby allocating, to the secondary system in the second coexistence system, frequency bands in the usable spectrum resources of the second coexistence system except the frequency bands which do not satisfy the coexistence management requirement. For example, when CH1 to CH4 are usable spectrum resources of the second coexistence system and CH3 is a frequency band that does not satisfy the coexistence management requirement, the spectrum coordination device 300 may allocate CH1, CH2, and CH4 to the secondary system of the second coexistence system.

As described above, according to an embodiment of the present disclosure, when the coexistence management requirement of the first coexistence system is not satisfied, the spectrum coordination device 300 may modify the spectrum resource of the secondary system in the second coexistence system, to avoid interference with the secondary system in other coexistence system.

As described above, according to an embodiment of the present disclosure, in a case that the coexistence management requirement of the first coexistence system is not satisfied, the spectrum coordination device 300 may modify the spectrum resource of the secondary system in the second coexistence system and/or the spectrum resource of the secondary system in the first coexistence system. According to an embodiment of the present disclosure, these two modification methods may be combined according to actual needs. For example, in a case that the coexistence management requirement of the first coexistence system is not satisfied, the spectrum coordination device 300 may request one or more times to modify the spectrum resource of the secondary system in the second coexistence system, and if the second coexistence system does not modify the spectrum resource of the secondary system in the second coexistence system, the spectrum coordination device 300 may modify the spectrum resource of the secondary system in the first coexistence system. In this case, the spectrum coordination device 300 may also receive information indicating whether the second coexistence system has modified the spectrum resource of the secondary system in the second coexistence system from the second coexistence system (for example, the second spectrum authorization device).

According to an embodiment of the present disclosure, the above described embodiments are particularly suitable for a case where it is determined by the spectrum division device that the coexistence management requirement of the first coexistence system is not satisfied. This is because, in a case that the coexistence management requirement of the first coexistence system is determined by the spectrum division device not to be satisfied, there is a high probability that there are secondary systems in the second coexistence system using the same spectrum resources as the secondary systems in the first coexistence system. Therefore, in this case, the spectrum coordination device 300 may request the secondary system in the first coexistence system not to use the same spectrum resource, or request the secondary system in the second coexistence system not to use the same spectrum resource, to avoid interference between secondary systems in two coexistence systems.

According to an embodiment of the present disclosure, the spectrum modification information for modifying the spectrum resource of the secondary system in the second coexistence system generated by the coordination unit 310 may include: allocating, to the secondary system in the second coexistence system, frequency bands located at the edge in the usable spectrum resources of the second coexistence system. For example, when CH1 to CH4 are usable spectrum resources of the second coexistence system, the spectrum coordination device 300 may allocate CH1 and/or CH4 to the secondary system of the second coexistence system. This is because, in the usable spectrum resources CH1 to CH4, CH1 and CH4 are frequency bands located at the edge.

As described above, according to an embodiment of the present disclosure, the spectrum coordination device 300 may try to make the secondary system in the second coexistence system use the frequency bands located at the edge, to ensure the continuity of the frequency bands of the first coexistence system to the greatest extent, thereby satisfying the coexistence management requirement of the first coexistence system.

Further, according to an embodiment of the present disclosure, when the determination unit 330 determines a frequency band that does not satisfy the coexistence management requirement of the first coexistence system according to the continuity of the usable spectrum resources, the spectrum modification information for modifying the spectrum resource of the secondary system in the second coexistence system generated by the coordination unit 310 may include: allocating, to the secondary system in the second coexistence system, a band located at the edge in a band that belongs to the usable spectrum resources of the second coexistence system and not satisfies the coexistence management requirement of the first coexistence system. For example, when CH1 to CH4 are the usable spectrum resources of the second coexistence system and the frequency bands that do not satisfy the coexistence management requirement of the first coexistence system determined by the determination unit 330 are CH3 and CH4, the spectrum coordination device 300 may allocates CH4 to the secondary system in the second coexistence system. This is because, both CH3 and CH4 belong to the usable spectrum resources of the second coexistence system, and in the CH3 and CH4, CH4 is a frequency band located at the edge.

As described above, according to an embodiment of the present disclosure, the spectrum coordination device 300 may try to make the secondary system in the second coexistence system use the frequency band located at the edge, so as to ensure the continuity of the frequency band of the first coexistence system to the greatest extent, thereby satisfying the coexistence management requirement of the first coexistence system. Further, the spectrum coordination device 300 may allocate, to the second coexistence system, frequency bands in frequency bands that do not satisfy the coexistence management requirement of the first coexistence system as much as possible, so as to minimize changes to the frequency bands allocated to the secondary system in the second coexistence system. For example, in the above example, the second coexistence system only needs to change the spectrum resource of the secondary system that originally allocated CH3 to CH4, and the secondary system that originally allocated CH4 does not need to change the allocation of spectrum resource.

Further, according to an embodiment of the present disclosure, in a case that none of the frequency bands that do not satisfy the coexistence management requirement of the first coexistence system determined by the determination unit 330 is a frequency band located at the edge, the spectrum modification information for modifying the spectrum resource of the secondary system in the second coexistence system generated by the coordination unit 310 may include: allocating, to the secondary system in the second coexistence system, frequency bands located at the edge in the usable spectrum resources of the second coexistence system except the frequency bands that do not satisfy the coexistence management requirement. For example, when CH1 to CH4 are usable spectrum resources of the second coexistence system, and CH3 is a frequency band that does not satisfy the coexistence management requirement, the spectrum coordination device 300 may allocate CH1 and/or CH4 to the secondary system of the second coexistence system. This is because, in the usable spectrum resources CH1 to CH4, CH1 and CH4 are frequency bands located at the edge.

As described above, according to an embodiment of the present disclosure, when the coexistence management requirement of the first coexistence system is not satisfied, the spectrum coordination device 300 may modify the spectrum resources of the secondary system in the second coexistence system, to ensure the continuity of the remaining spectrum resources as much as possible.

According to an embodiment of the present disclosure, the spectrum modification information for modifying the spectrum resource of the secondary system in the first coexistence system generated by the coordination unit 310 may include: allocating, to the coexistence groups in the first coexistence system, frequency bands in the usable spectrum resources of the first coexistence system except the frequency bands allocated to the secondary systems in the second coexistence system.

For example, when CH1 to CH4 are usable spectrum resources of the second coexistence system, and CH3 is a frequency band that does not satisfy the coexistence management requirement, the spectrum coordination device 300 may allocate CH1 and/or CH4 to the secondary system in the second coexistence system. It is assumed that the spectrum coordination device 300 allocates CH1 to the secondary systems in the second coexistence system, the spectrum coordination device 300 may allocate CH2, CH3, and CH4 to the secondary system in the first coexistence system.

As described above, according to an embodiment of the present disclosure, in a case that the coexistence management requirement of the first coexistence system is not satisfied, the spectrum coordination device 300 may modify the spectrum resource of the secondary system in the second coexistence system, and further modify, according to the modification to the spectrum resource of the secondary system in the second coexistence system, the spectrum resource of the secondary system in the first coexistence system, to ensure the continuity of the spectrum resource of the first coexistence system as much as possible.

According to an embodiment of the present disclosure, the spectrum coordination device 300 may also send spectrum modification information for modifying the spectrum resources of the secondary system in the first coexistence system to the spectrum division device in the first coexistence system via the communication unit 320. Here, the spectrum coordination device 300 may allocate spectrum resources to the coexistence group managed by each of spectrum division devices according to the above modified spectrum, and send the spectrum modification information to the spectrum division device in the first coexistence system. The spectrum modification information here includes spectrum resources allocated to the coexistence group managed by each of spectrum division devices.

According to an embodiment of the present disclosure, the spectrum authorization device in the first coexistence system is configured to determine the usable spectrum resources of the first coexistence system, such that the coordination unit 310 of the spectrum coordination device 300 may allocate spectrum resources to one or more coexistence groups in the first coexistence system based on the usable spectrum resources of the first coexistence system.

According to an embodiment of the present disclosure, the spectrum coordination device 300 may send spectrum modification information for modifying the spectrum resource of the secondary system in the second coexistence system to the second spectrum authorization device via the communication unit 320. For example, the spectrum coordination device 300 may communicate with the second spectrum authorization device through the first spectrum authorization device, to achieve the foregoing purpose. According to an embodiment of the present disclosure, the spectrum modification information for modifying the spectrum resource of the secondary system in the second coexistence system may include a frequency band allocated to the secondary system in the second coexistence system.

It can be seen that, according to an embodiment of the present disclosure, it may be determined by the spectrum coordination device or the spectrum division device whether the coexistence management requirement of the first coexistence system is satisfied, and in a case that the coexistence management requirement of the first coexistence system is not satisfied, the spectrum modification information for modifying the spectrum resource of the secondary system in the first coexistence system and/or for modifying the spectrum resource of the secondary system in other coexistence system may be generated. In this way, when allocating spectrum resource to the secondary system in the coexistence system, the spectrum resources of the secondary systems in other coexistence systems may be considered, such that coordination between different coexistence systems is possible, thereby avoiding interference between the secondary systems in different coexistence systems and ensuring the continuity of spectrum resources as much as possible.

3. Example of a Configuration of a Spectrum Division Device

Figure 4:
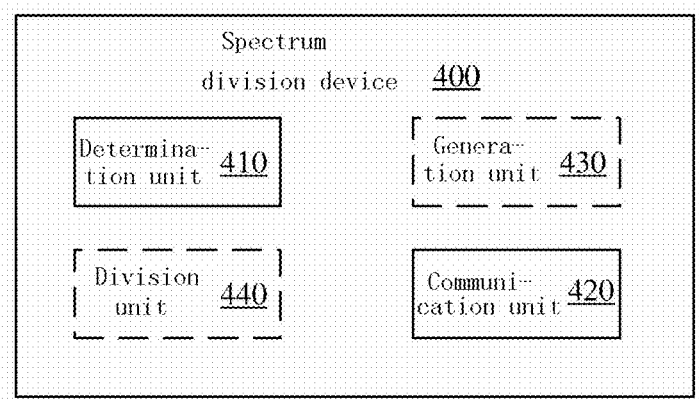
FIG. 4 is a block diagram showing an example of a configuration of a spectrum division device according to an embodiment of the present disclosure.

FIG. 4 is a block diagram showing a structure of a spectrum division device 400 according to an embodiment of the present disclosure. The spectrum division device 400 here may be, for example, a C×M. The spectrum division device according to an embodiment of the present disclosure is applied in a wireless communication system. The wireless communication system includes a first coexistence system, and the first coexistence system includes a spectrum coordination device, a spectrum division device, and one or more secondary systems divided into coexistence groups. In addition, the spectrum dividing device 400 is used to manage one of the coexistence groups.

As shown in FIG. 4, the spectrum division device 400 may include a determination unit 410 and a communication unit 420.

Here, all units of the spectrum division device 400 may be included in a processing circuitry. It should be noted that the spectrum division device 400 may include one processing circuitry or multiple processing circuitries. Further, the processing circuitry may include various discrete functional units to perform different functions and/or operations. It should be noted that these functional units may be physical entities or logical entities, and units with different names may be implemented by the same physical entity.

According to an embodiment of the present disclosure, the determination unit 410 may determine whether the transmission power of one or more secondary systems in the coexistence group managed by the spectrum division device 400 satisfies the coexistence management requirement of the first coexistence system.

According to an embodiment of the present disclosure, in a case where the transmission power of the one or more secondary systems does not satisfy the coexistence management requirement of the first coexistence system, the spectrum division device 400 may send a spectrum usage report to the spectrum coordination device via the communication unit 420.

As described above, the spectrum division device 400 according to the embodiment of the present disclosure may determine whether the transmission power of each of secondary systems in the coexistence group managed by the spectrum division device 400 satisfies the coexistence management requirement of the first coexistence system, and may send a spectrum usage report to the spectrum coordination device in a case that the coexistence management requirement is not satisfied, such that the spectrum coordination device may modify the spectrum resource of the secondary system in the first coexistence system or modify the spectrum resource of the secondary system of other coexistence system according to the spectrum usage report. In this way, when allocating spectrum resources to the secondary systems in the coexistence system, the spectrum resources of the secondary systems in other coexistence systems may be considered, such that coordination between different coexistence systems is possible, thereby reasonably allocating spectrum resources to the secondary systems, and thus, resources can be effectively used without interference between secondary systems.

According to an embodiment of the present disclosure, in a case where the transmission power of the one or more secondary systems is less than a predetermined threshold, the determination unit 410 may determine that the one or more secondary systems do not satisfy the coexistence management requirement of the first coexistence system.

According to an embodiment of the present disclosure, in a case where the transmission power of the one or more secondary systems is less than a predetermined threshold, there may be a high probability that the secondary systems of other coexistence systems use the same frequency band as the one or more secondary systems. This situation may be caused by the lack of coordination between different coexistence systems. Therefore, in this case, the determination unit 410 may determine that the coexistence management requirement of the first coexistence system is not satisfied.

As shown in FIG. 4, according to an embodiment of the present disclosure, the spectrum division device 400 may further include a generation unit 430 configured to generate a spectrum usage report. Further, the spectrum usage report may include frequency band information of one or more secondary systems that do not satisfy the coexistence management requirement of the first coexistence system. For example, when the spectrum division device 400 allocates CH1 to a certain secondary system and the transmission power of the secondary system on CH1 is less than a predetermined threshold, the spectrum usage report may include CH1 information.

As shown in FIG. 4, according to an embodiment of the present disclosure, the spectrum division device 400 may further include a division unit 440 configured to allocate spectrum resources to the coexistence group managed by the spectrum division device 400 according to the usable spectrum resources from the spectrum coordination device.

According to an embodiment of the present disclosure, the division unit 440 of the spectrum division device 400 may allocate spectrum resources to the coexistence group managed by the spectrum division device 400 according to the usable spectrum resources from the spectrum coordination device. When allocating spectrum resources, the spectrum division device 400 may calculate the transmission power of each of secondary systems on the allocated frequency band. If it is found that the transmission power of the frequency band allocated to a certain secondary system or some secondary systems is less than a predetermined threshold, the generation unit 430 may generate a spectrum usage report to send to the spectrum coordination device.

According to an embodiment of the present disclosure, the spectrum division device 400 may receive spectrum modification information from the spectrum coordination device via the communication unit 420. The spectrum modification information includes the spectrum resources reallocated to the spectrum division device 400.

According to an embodiment of the present disclosure, the division unit 440 may allocate, according to the spectrum modification information, spectrum sources to one or more secondary systems in coexistence groups managed by the spectrum division device 400. For example, the spectrum modification information includes frequency bands in the usable spectrum resources of the first coexistence system except the frequency bands which do not satisfy the coexistence management requirement, and then, the division unit 440 may allocate, to the secondary system in the coexistence group, spectrum resources in the frequency bands in the usable spectrum resources of the first coexistence system except the frequency bands which do not satisfy the coexistence management requirement. For another example, the spectrum modification information includes frequency bands in the usable spectrum resources of the first coexistence system except the frequency bands which are allocated to the secondary system in the second coexistence system, and then, the division unit 440 may allocate, to the secondary system in the coexistence group, spectrum resources in the frequency bands in the usable spectrum resources of the first coexistence system except the frequency bands which are allocated to the secondary system in the second coexistence system.

The spectrum division device 400 according to an embodiment of the present disclosure may allocate spectrum resources to the secondary system according to the usable spectrum resources received from the spectrum coordination device 300. Therefore, all embodiments of the spectrum coordination device 300 described in the foregoing are suitable for this embodiment.

4. Example of a Configuration of a Spectrum Authorization Device

Figure 5:
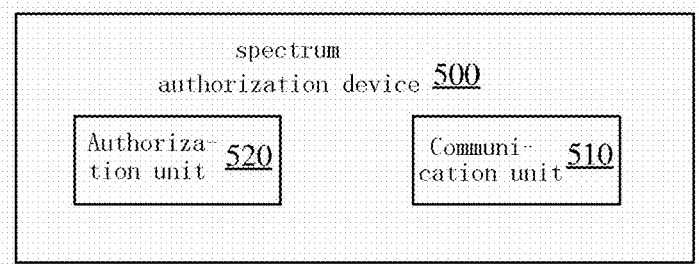
FIG. 5 is a block diagram showing an example of a configuration of a spectrum authorization device according to an embodiment of the present disclosure.

FIG. 5 is a block diagram showing a structure of a spectrum authorization device 500 according to an embodiment of the present disclosure. The spectrum authorization device 500 here may be, for example, a SAS. The spectrum authorization device 500 according to an embodiment of the present disclosure is applied to a wireless communication system. The wireless communication system includes a first coexistence system and a second coexistence system. The first coexistence system includes a spectrum coordination device and one or more secondary systems. The second coexistence system includes a spectrum authorization device 500 and one or more secondary systems.

As shown in FIG. 5, the spectrum authorization device 500 may include an authorization unit 520 and a communication unit 510.

Here, all units of the spectrum authorization device 500 may be included in a processing circuitry. It should be noted that the spectrum authorization device 500 may include one processing circuitry or multiple processing circuitries. Further, the processing circuitry may include various discrete functional units to perform different functions and/or operations. It should be noted that these functional units may be physical entities or logical entities, and units with different names may be implemented by the same physical entity.

According to an embodiment of the present disclosure, the spectrum authorization device 500 may receive spectrum modification information from the spectrum coordination device via the communication unit 510. For example, the spectrum authorization device 500 may receive the spectrum modification information from the spectrum coordination device through the first spectrum authorization device in the first coexistence system.

According to an embodiment of the present disclosure, the authorization unit 520 may modify the spectrum resource of the secondary system in the second coexistence system according to the spectrum modification information.

According to an embodiment of the present disclosure, the spectrum modification information may include spectrum resources allocated to the secondary system in the second coexistence system. For example, when the spectrum modification information includes frequency bands in the usable spectrum resources of the second coexistence system except the frequency bands which do not satisfy the coexistence management requirement of the first coexistence system, the authorization unit 520 may allocate, to the secondary system in the second coexistence system, spectrum resources in the frequency bands in the usable spectrum resources of the second coexistence system except the frequency bands which do not satisfy the coexistence management requirement of the first coexistence system. For another example, when the spectrum modification information includes frequency bands located at the edge in the usable spectrum resources of the second coexistence system, the authorization unit 520 may allocate, to the secondary system in the second coexistence system, spectrum resources in the frequency bands located at the edge in the usable spectrum resources of the second coexistence system.

As described above, the spectrum authorization device 500 according to an embodiment of the present disclosure may modify the spectrum resources of the secondary system managed by the spectrum authorization device 500 based on information from other coexistence systems, thereby enabling coordination between different coexistence systems becomes possible, to achieve a goal of avoiding interference between secondary systems in different coexistence systems and ensuring the continuity of spectrum resources.

The spectrum coordination device 300 according to an embodiment of the present disclosure may determine the usable spectrum resources for the spectrum division device 400 according to the usable spectrum resources received from the spectrum authorization device 500. Therefore, therefore, all embodiments of the spectrum coordination device 300 and the spectrum division device 400 described in the foregoing are suitable for this embodiment.

5. Example of a Configuration of a Wireless Communication System

As described above, a wireless communication system is provided according to the present disclosure. The wireless communications system includes a first coexistence system and a second coexistence system. The first coexistence system includes: one or more secondary systems divided into coexistence groups; and a spectrum coordination device configured to allocate spectrum resources to the coexistence groups in the first coexistence system according to the usable spectrum resources of the first coexistence system. The second coexistence system includes: one or more secondary systems; and a spectrum authorization device configured to allocate spectrum resources to a secondary system in the second coexistence system according to usable spectrum resources of the second coexistence system.

According to an embodiment of the present disclosure, the spectrum coordination device is configured to generate, in a case where a coexistence management requirement of the first coexistence system is not satisfied, spectrum modification information for modifying spectrum resource of the secondary system in the second coexistence system, and the spectrum authorization device is configured to receive spectrum modification information from the spectrum coordination device; and modify spectrum resources of the secondary system in the second coexistence system according to the spectrum modification information.

According to an embodiment of the present disclosure, the first coexistence system may further include a first spectrum authorization device configured to determine the usable spectrum resources of the first coexistence system.

Further, according to an embodiment of the present disclosure, the first coexistence system may further include one or more spectrum division devices configured to allocate spectrum resources to one or more secondary systems in the coexistence group managed by the spectrum division device based on the spectrum resources allocated by the spectrum coordination device for the coexistence group.

Here, the spectrum coordination device may be implemented by the spectrum coordination device 300 described above, the spectrum division device may be implemented by the spectrum division device 400 described above, and the spectrum authorization device in the second coexistence system may be implemented by the spectrum authorization apparatus 500 described above, and thus, all embodiments described in the foregoing are suitable for this embodiment.

FIG. 6 to FIG. 9 are signaling flowcharts showing a spectrum management method according to an embodiment of the present disclosure. In FIG. 6 to FIG. 9, SAS1, GSC, C×M, and CBSD1 belong to a first coexistence system, and SAS2 and CBSD2 belong to a second coexistence system. That is, the GSC may be implemented by the spectrum coordination device 300 described above, the C×M may be implemented by the spectrum division device 400 described above, and the SAS2 may be implemented by the spectrum authorization device 500 described above.

Figure 6:
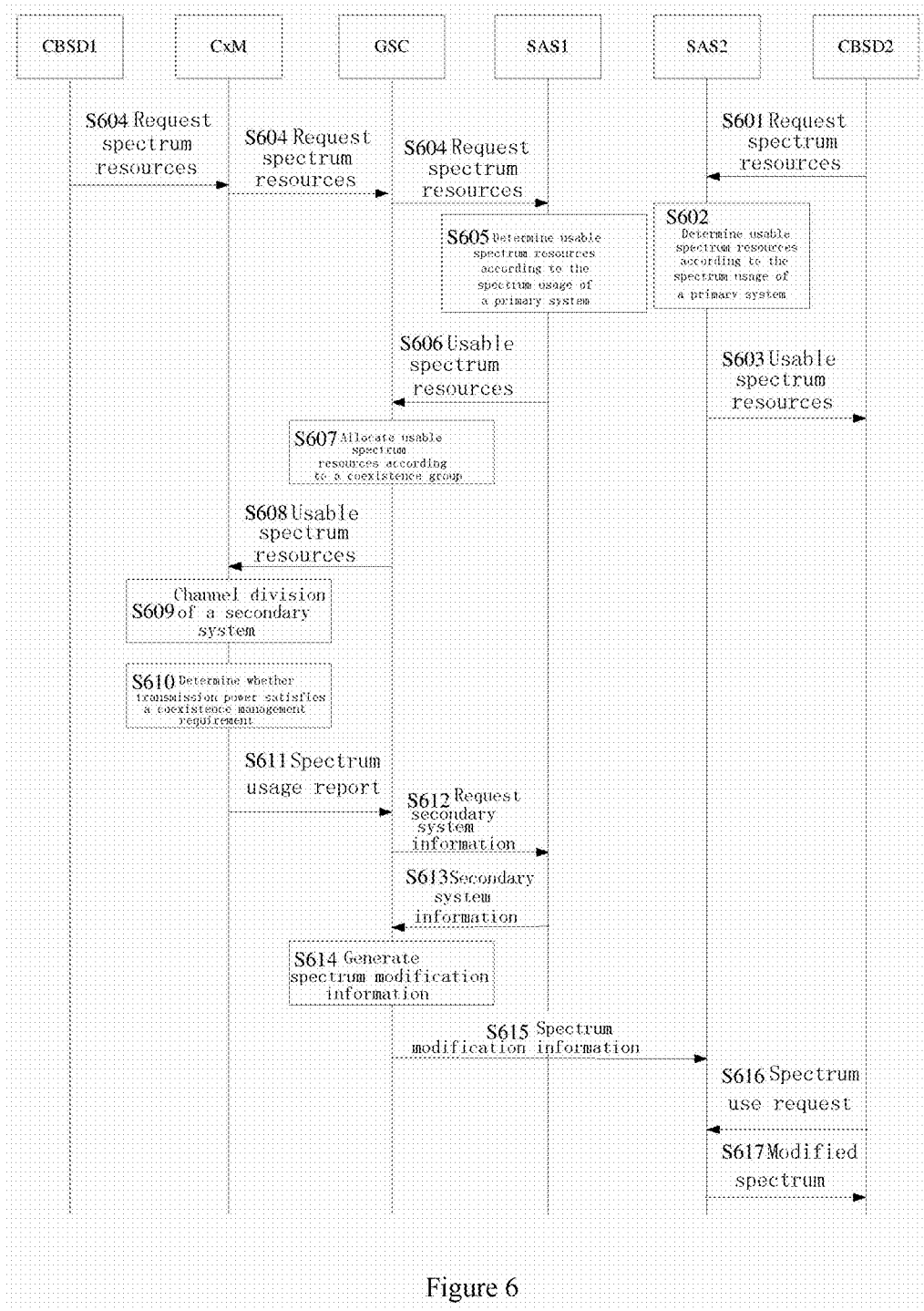
FIG. 6 is a signaling flowchart showing a spectrum management method according to an embodiment of the present disclosure.

In an embodiment shown in FIG. 6, the C×M determines whether a coexistence management requirement of the first coexistence system is satisfied, and in a case that the coexistence management requirement of the first coexistence system is not satisfied, the spectrum coordination device generates the spectrum modification information for modifying the spectrum resource of the secondary system in the second coexistence system. As shown in FIG. 6, in step S601, the CBSD2 requests spectrum resources to the SAS2. Next, in step S602, the SAS2 determines usable spectrum resources of the second coexistence system according to the spectrum usage of the primary system. Next, in step S603, the SAS2 sends the usable spectrum resources to the CBSD2. In step S604, the CBSD1 requests spectrum resources to the C×M that manages the CBSD1, and then the C×M requests spectrum resources to the GSC, and the GSC requests spectrum resources to the SAS1. Next, in step S605, the SAS1 determines usable spectrum resources of the first coexistence system according to the spectrum usage of the primary system. Next, in step S606, the SAS1 sends the usable spectrum resources of the first coexistence system to the GSC in the first coexistence system. It is worth noting that the processes of the CBSD2 requesting spectrum resources to the SAS2 and the CBSD1 requesting spectrum resources to the SAS1 are independent, and therefore, the sequence numbers in the figure do not indicate the sequence of events. Next, in step S607, the GSC allocates spectrum resources to a coexistence group according to the usable spectrum resources from the SAS1. Next, in step S608, the GSC sends the spectrum resources allocated for the coexistence group to the C×M in the first coexistence system. Next, in step S609, the C×M allocates spectrum resources to the CBSD managed by the C×M according to the spectrum resources from the GSC. Next, in step S610, the C×M determines whether the transmission power of the CBSD managed by the C×M satisfies a coexistence management requirement of the first coexistence system. It is assumed here that the transmission power of the CBSD1 does not satisfy the coexistence management requirement of the first coexistence system. Next, in step S611, the C×M sends a spectrum usage report to the GSC. Next, in step S612, the GSC requests secondary system information to the SAS1, where the secondary system information includes information of all secondary systems in a wireless communication system, and may include, for example, a location and spectrum resource usage. Next, in step S613, the GSC obtains secondary system information from the SAS1, so as to know which secondary system or secondary systems in the entire wireless communication system have the same frequency band as the frequency band that does not satisfy the coexistence management requirement. Next, in step S614, the GSC generates spectrum modification information for modifying the spectrum resource of the secondary system in the second coexistence system. The spectrum modification information includes spectrum resources allocated to the secondary system in the second coexistence system, for example, frequency bands in the usable spectrum resources of the second coexistence system except the frequency bands which do not satisfy the coexistence management requirement of the first coexistence system. Next, in step S615, the GSC sends the spectrum modification information to the SAS2. Next, in step S616, when the CBSD2 sends a spectrum use request to the SAS2, in step S617, the SAS2 may send the modified spectrum resource to the CBSD2.

As described above, FIG. 6 shows a situation where the C×M determines whether the coexistence management requirement of the first coexistence system is satisfied. In a case that the C×M determines that the coexistence management requirement of the first coexistence system is not satisfied, it means that there may be a secondary system (CBSD2) in other coexistence system in the wireless communication system that uses the same frequency band as the secondary system (CBSD1) in the first coexistence system. For example, in the scenario shown in FIG. 1, both the secondary system 4 and the secondary system 5 use CH4. In this case, as shown in FIG. 6, the GSC may request the SAS2 to modify the spectrum resource for the CBSD2, for example, to use a frequency band except CH4, to prevent the secondary system 4 and the secondary system 5 from using the same frequency band.

Figure 7:
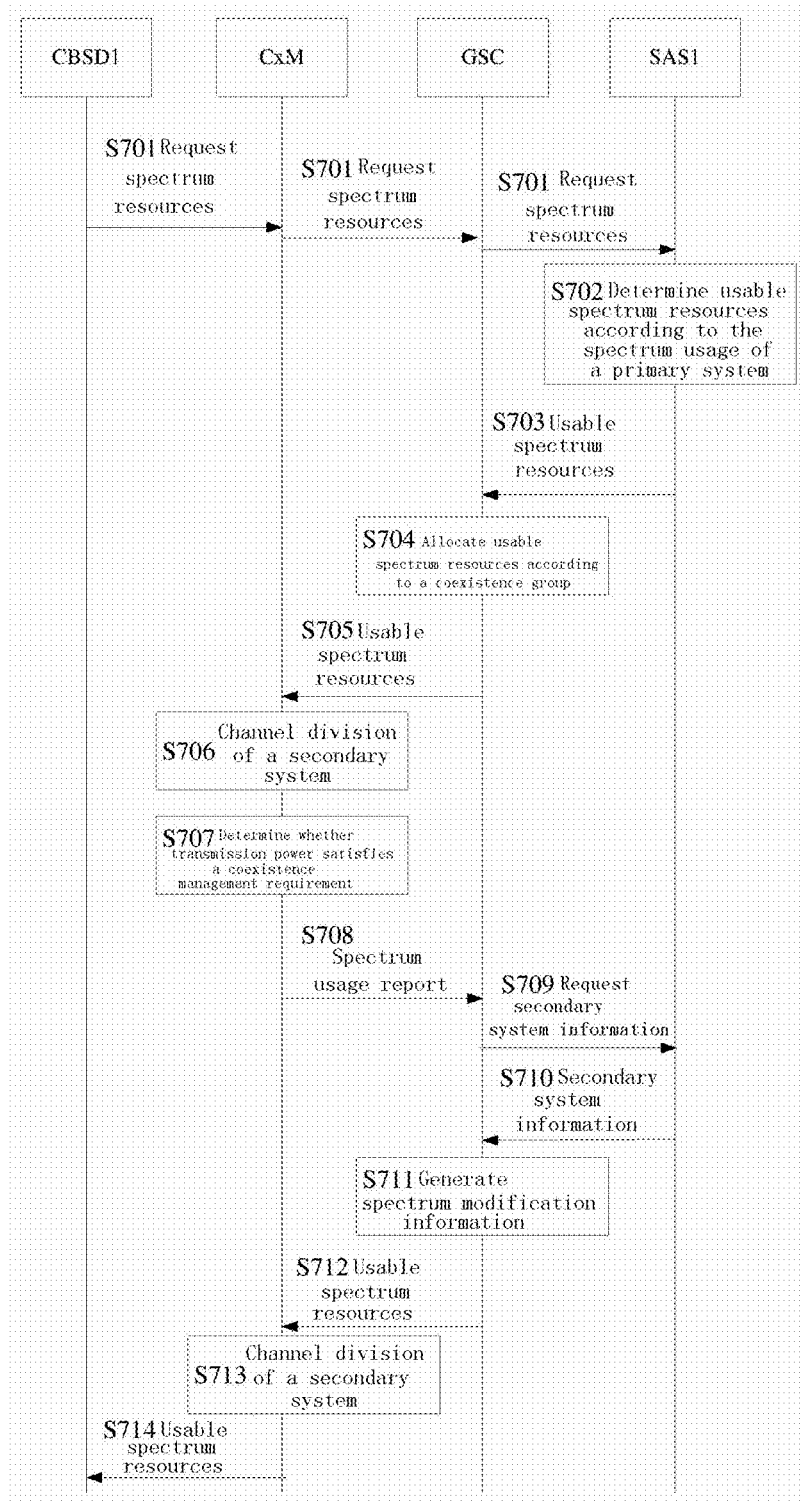
FIG. 7 is a signaling flowchart showing a spectrum management method according to an embodiment of the present disclosure.

In an embodiment shown in FIG. 7, C×M determines whether a coexistence management requirement of a first coexistence system is satisfied, and in a case that a coexistence management requirement of a first coexistence system is not satisfied, a spectrum coordination device generates spectrum modification information for modifying the spectrum resource of a secondary system in the first coexistence system. As shown in FIG. 6, in step S701, CBSD1 requests spectrum resources to the C×M that manages the CBSD1, and then, the C×M requests spectrum resources to GSC, and the GSC requests spectrum resources to SAS1. Next, in step S702, the SAS1 determines usable spectrum resources of the first coexistence system according to the spectrum usage of the primary system. Next, in step S703, the SAS1 sends the usable spectrum resources of the first coexistence system to the GSC in the first coexistence system. Next, in step S704, the GSC allocates spectrum resources to the coexistence group according to the usable spectrum resources from the SAS1. Next, in step S705, the GSC sends the spectrum resources allocated to the coexistence group to the C×M in the first coexistence system. Next, in step S706, the C×M allocates spectrum resources to CBSD managed by the C×M according to the spectrum resources from the GSC. Next, in step S707, the C×M determines whether the transmission power of the CBSD managed by the C×M satisfies the coexistence management requirement of the first coexistence system. It is assumed here that the transmission power of the CBSD1 does not satisfy the coexistence management requirement of the first coexistence system. Next, in step S708, the C×M sends a spectrum usage report to the GSC. Next, in step S709, the GSC requests secondary system information to the SAS1, where the secondary system information includes information of all the secondary systems in a wireless communication system, and may include, for example, a location and spectrum resource usage. Next, in step S710, the GSC obtains the secondary system information from the SAS1, so as to know which secondary system or secondary systems in the entire wireless communication system have the same frequency band as the frequency band that does not satisfy the coexistence management requirement. Next, in step S711, the GSC generates spectrum modification information for modifying the spectrum resource of the secondary system in the first coexistence system. The spectrum modification information includes spectrum resources allocated to the secondary system in the first coexistence system, for example, frequency bands in the usable spectrum resources of the first coexistence system except the frequency bands which do not satisfy the coexistence management requirement of the first coexistence system. Next, in step S712, the GSC allocates spectrum resources to the coexistence group based on the spectrum modification information. In other words, the spectrum resources allocated to the coexistence group do not include the frequency bands that do not satisfy the coexistence management requirement as described above. Next, in step S713, the C×M allocates spectrum resources to the secondary system managed by the C×M according to the modified spectrum resources from the GSC. Next, in step S714, the C×M sends the spectrum resources allocated to the secondary system managed by the C×M to the corresponding secondary system.

As described above, FIG. 7 shows a situation where the C×M determines whether the coexistence management requirement of the first coexistence system is satisfied. In a case that C×M determines that the coexistence management requirement of the first coexistence system is not satisfied, it means that there may be secondary systems in the other coexistence system in the wireless communication system that use the same frequency band as the secondary system (CBSD1) in the first coexistence system. For example, in the scenario shown in FIG. 1, both the secondary system 4 and the secondary system 5 use CH4. In this case, as shown in FIG. 7, the GSC may modify the spectrum resource for the CBSD1, for example, use a frequency band except CH4, so as to prevent the secondary system 4 and the secondary system 5 from using the same frequency band.

Figure 8:
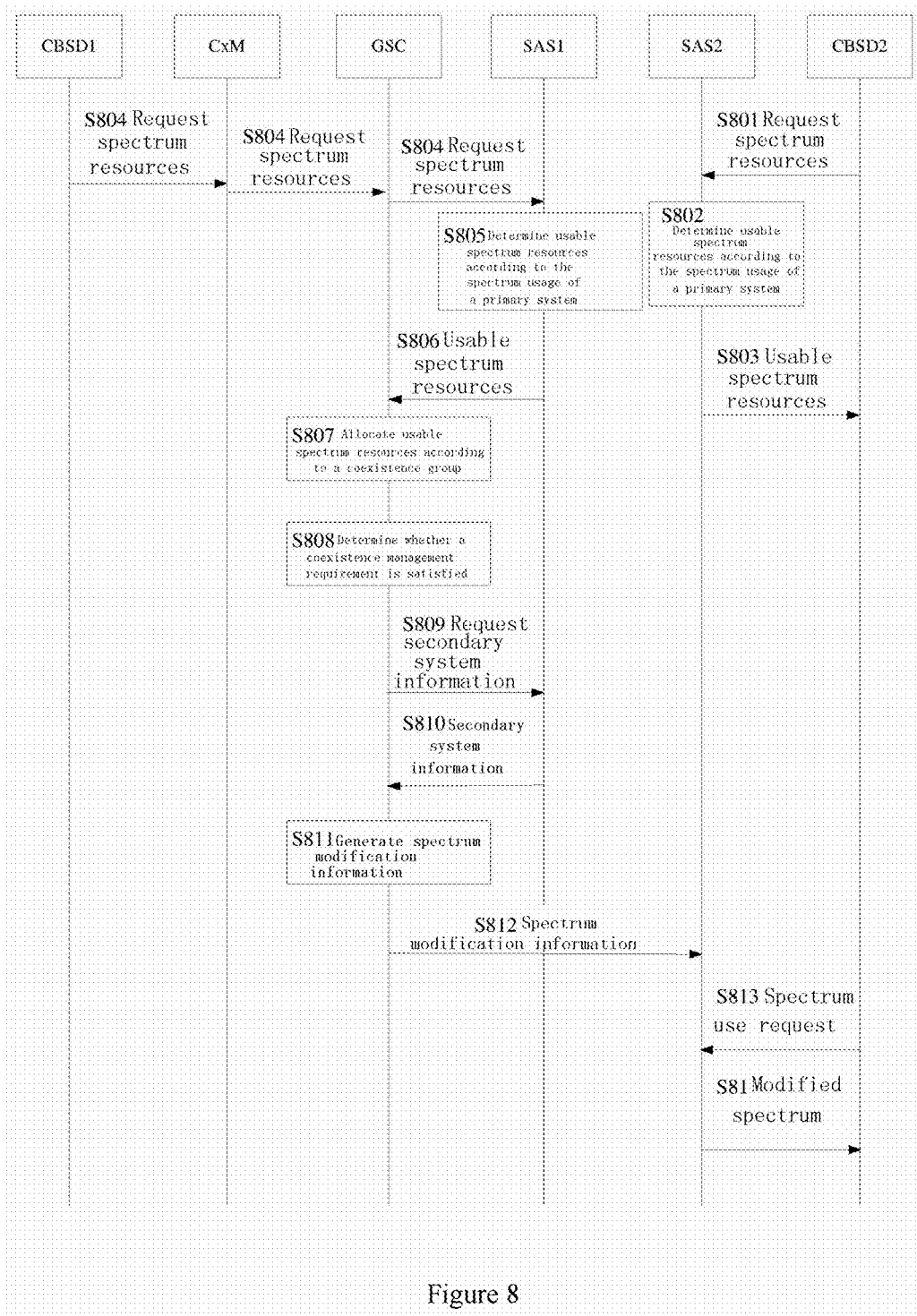
FIG. 8 is a signaling flowchart showing a spectrum management method according to an embodiment of the present disclosure.

In an embodiment shown in FIG. 8, GSC determines whether a coexistence management requirement of a first coexistence system is satisfied, and in a case that the coexistence management requirement of the first coexistence system is not satisfied, a spectrum coordination device generates spectrum modification information for modifying the spectrum resource of the secondary system in a second coexistence system. As shown in FIG. 8, in step S801, CBSD2 requests spectrum resources to SAS2. Next, in step S802, the SAS2 determines usable spectrum resources of the second coexistence system according to the spectrum usage of the primary system. Next, in step S803, the SAS2 sends the usable spectrum resources to CBSD2. In step S804, CBSD1 requests spectrum resources to C×M that manages the CBSD1, and then, the C×M requests spectrum resources to GSC, and then GSC requests spectrum resources to SAS1. Next, in step S805, the SAS1 determines usable spectrum resources of the first coexistence system according to the spectrum usage of the primary system. Next, in step S806, the SAS1 sends the usable spectrum resources of the first coexistence system to the GSC in the first coexistence system. It is worth noting that the processes of the CBSD2 requesting spectrum resources to the SAS2 and the CBSD1 requesting spectrum resources to the SAS1 are independent, and therefore, the sequence numbers in the figure do not indicate the sequence of events. Next, in step S807, the GSC allocates spectrum resources to the coexistence group according to the usable spectrum resources from the SAS1. Next, in step S808, the GSC determines whether the coexistence management requirement of the first coexistence system is satisfied. For example, the GSC may determine whether the usable spectrum resources of the first coexistence system are consecutive. It is assumed that the discontinuity of the usable spectrum resources of the first coexistence system causes the coexistence management requirement of the first coexistence system to not be satisfied. Next, in step S809, the GSC requests secondary system information to the SAS1, where the secondary system information includes information of all the secondary systems in a wireless communication system, and may include, for example, a location and spectrum resource usage. Next, in step S810, the GSC obtains the secondary system information from the SAS1, so as to know the spectrum usage of the secondary systems in the entire wireless communication system. Next, in step S811, the GSC generates spectrum modification information for modifying the spectrum resource of the secondary system in the second coexistence system. The spectrum modification information includes spectrum resources allocated to the secondary system in the second coexistence system, for example, frequency bands located at the edge in the usable spectrum resources of the second coexistence system. Next, in step S812, the GSC sends the spectrum modification information to the SAS2. Next, in step S813, when the CBSD2 sends a spectrum use request to the SAS2, in step S814, the SAS2 may send the modified spectrum resource to the CBSD2.

As described above, FIG. 8 shows a situation where the GSC determines whether the coexistence management requirement of the first coexistence system is satisfied. When the GSC determines that the coexistence management requirement of the first coexistence system is not satisfied, it means that the secondary systems in other coexistence systems in the wireless communication system use frequency bands in the usable spectrum in a decentralized form. For example, in the scenario shown in FIG. 1, the secondary system 5 uses CH4, the secondary system 6 uses CH1, and the secondary system 7 uses CH3. In this case, as shown in FIG. 8, the GSC may request SAS2 to modify the spectrum resources for the CBSD managed by the SAS2, for example, use CH4 or use CH1 to ensure the continuity of the remaining spectrum resources as much as possible.

Figure 9:
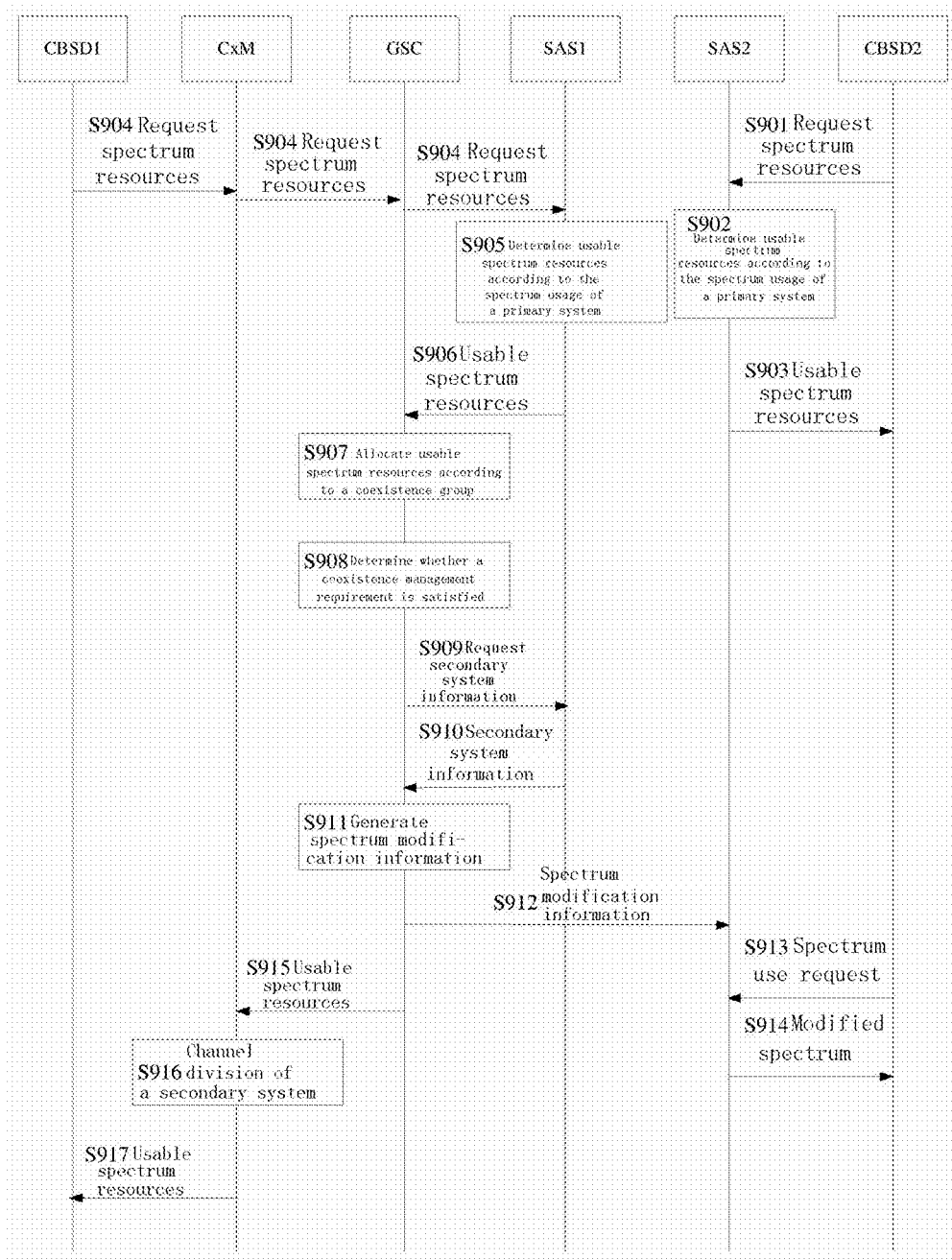
FIG. 9 is a signaling flowchart showing a spectrum management method according to an embodiment of the present disclosure.

In an embodiment shown in FIG. 9, GSC determines whether a coexistence management requirement of a first coexistence system is satisfied, and in a case that the coexistence management requirement of the first coexistence system is not satisfied, a spectrum coordination device generates spectrum modification information for modifying the spectrum resource of the secondary system in a second coexistence system and spectrum modification information for modifying the spectrum resource of the secondary system in the first coexistence system. Steps S901 to S910 in FIG. 9 respectively correspond to steps S801 to S810 in FIG. 8, which are not repeated here. Next, only steps in FIG. 9 that are different from those in FIG. 8 will be described. In step S911, the GSC generates spectrum modification information for modifying the spectrum resource of the secondary system in the second coexistence system. The spectrum modification information includes spectrum resources allocated to the secondary system in the second coexistence system, for example, frequency bands located at the edge in usable spectrum resources of the second coexistence system. Furthermore, in step S911, the GSC also generates spectrum modification information for modifying the spectrum resources of the secondary system in the first coexistence system. The spectrum modification information includes spectrum resources allocated to the secondary system in the first coexistence system, for example, resources in usable spectrum resources of the first coexistence system except resources allocated to the second coexistence system. Next, in step S912, the GSC sends the spectrum modification information to SAS2. Next, in step S913, when CBSD2 sends a spectrum use request to the SAS2, in step S914, the SAS2 may send the modified spectrum resource to the CBSD2. In step S915, the GSC allocates spectrum resources to the coexistence group based on the spectrum modification information. Next, in step S916, C×M allocates spectrum resources to the secondary system managed by the C×M according to the modified spectrum resources from the GSC. Next, in step S917, the C×M sends the spectrum resources allocated to the secondary system managed by the C×M to the corresponding secondary system.

As described above, FIG. 9 shows a situation where the GSC determines whether the coexistence management requirement of the first coexistence system is satisfied. When the GSC determines that the coexistence management requirement of the first coexistence system is not satisfied, it means that the secondary systems in other coexistence systems in the wireless communication system use frequency bands in the usable spectrum in a decentralized form. For example, in the scenario shown in FIG. 1, the secondary system 5 uses CH4, the secondary system 6 uses CH1, and the secondary system 7 uses CH3. In this case, as shown in FIG. 9, the GSC may request the SAS2 to modify spectrum resources for the CBSD managed by the SAS2, for example, to use CH4, and may allocate spectrum to the coexistence group based on the spectrum resources allocated to the secondary system in the second coexistence system, for example, allocate CH1 to CH3 to the coexistence group in the first coexistence system, so as to ensure the continuity of the spectrum resources of the first coexistence system as much as possible.

As described above, FIG. 6 to FIG. 9 illustrate the spectrum resource allocation process according to an embodiment of the present disclosure in an exemplary manner. Those skilled in the art should understand that, without violating the spirit of the present disclosure, adaptive modification and variation may be performed on the foregoing spectrum resource allocation process.

6. Method Embodiment

Subsequently, a wireless communication method performed by a spectrum coordination device 300 in a wireless communication system according to an embodiment of the present disclosure is described in detail. The wireless communication system includes a first coexistence system and a second coexistence system. The first coexistence system includes a spectrum coordination device 300 and one or more secondary systems divided into coexistence groups, and the second coexistence system includes one or more secondary systems.

Figure 10:
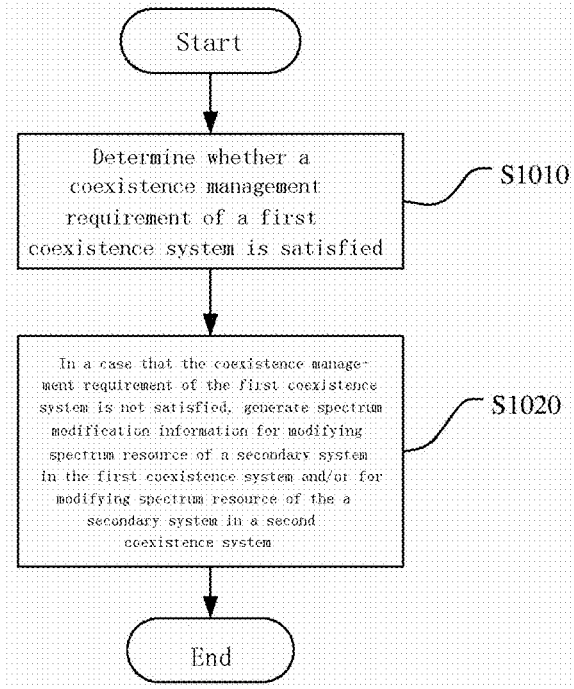
FIG. 10 is a flowchart showing a wireless communication method performed by a spectrum coordination device according to an embodiment of the present disclosure.

FIG. 10 is a flowchart showing a wireless communication method performed by a spectrum coordination device 300 in a wireless communication system according to an embodiment of the present disclosure.

As shown in FIG. 10, in step S1010, it is determined whether a coexistence management requirement of a first coexistence system is satisfied.

Next, in step S1020, in a case that the coexistence management requirement of the first coexistence system is not satisfied, spectrum modification information for modifying spectrum resource of a secondary system in the first coexistence system and/or for modifying spectrum resource of the a secondary system in a second coexistence system is generated.

Preferably, the first coexistence system includes one or more spectrum division devices, and the wireless communication method further includes: receiving a spectrum usage report from the spectrum division device; and determining, according to the spectrum usage report, whether the coexistence management requirement of the first coexistence system is satisfied.

Preferably, the wireless communication method further includes: determining, according to the spectrum usage report, frequency band which does not satisfy the coexistence management requirement of the first coexistence system.

Preferably, the wireless communication method further includes: determining a consecutive usage period of time of usable spectrum resources of the first coexistence system; and determining, in a case where a consecutive usage period-of-time requirement with respect to frequency bands of one coexistence group is not satisfied, that the coexistence management requirement of the first coexistence system is not satisfied.

Preferably, the wireless communication method further includes: sending the spectrum modification information for modifying the spectrum resource of the secondary system in the first coexistence system to the spectrum division device in the first coexistence system.

Preferably, the spectrum modification information for modifying the spectrum resource of the secondary system in the first coexistence system includes: allocating, to the coexistence groups in the first coexistence system, frequency bands in the usable spectrum resources of the first coexistence system which satisfy the coexistence management requirement.

Preferably, the second coexistence system further includes a second spectrum authorization device for determining usable spectrum resources of the second coexistence system, and the wireless communication method further includes: sending the spectrum modification information for modifying the spectrum resource of the secondary system in the second coexistence system to the second spectrum authorization device.

Preferably, the spectrum modification information for modifying the spectrum resource of the secondary system in the second coexistence system includes: allocating, to the secondary system in the second coexistence system, frequency bands in the usable spectrum resources of the second coexistence system except the frequency bands which do not satisfy the coexistence management requirement.

Preferably, the spectrum modification information for modifying the spectrum resource of the secondary system in the second coexistence system includes: allocating, to the secondary system in the second coexistence system, frequency bands at the edge in the usable spectrum resources of the second coexistence system.

Preferably, the spectrum modification information for modifying the spectrum resource of the secondary system in the first coexistence system includes: allocating, to the coexistence groups in the first coexistence system, frequency bands in the usable spectrum resources of the first coexistence system except frequency bands allocated to the secondary systems in the second coexistence system.

Preferably, the first coexistence system further includes a first spectrum authorization device for determining usable spectrum resources of the first coexistence system, and the wireless communication method further includes: allocating spectrum resources to one or more coexistence groups in the first coexistence system according to the usable spectrum resources of the first coexistence system.

According to an embodiment of the present disclosure, the above method may be performed by the spectrum coordination device 300 according to the embodiment of the present disclosure. Therefore, all embodiments of the spectrum coordination device 300 described above are suitable for this embodiment.

Subsequently, a wireless communication method performed by a spectrum division device 400 in a wireless communication system according to an embodiment of the present disclosure is described in detail. The wireless communication system includes a first coexistence system, and the first coexistence system includes a spectrum coordination device, the spectrum division device and one or more secondary systems divided into coexistence groups.

Figure 11:
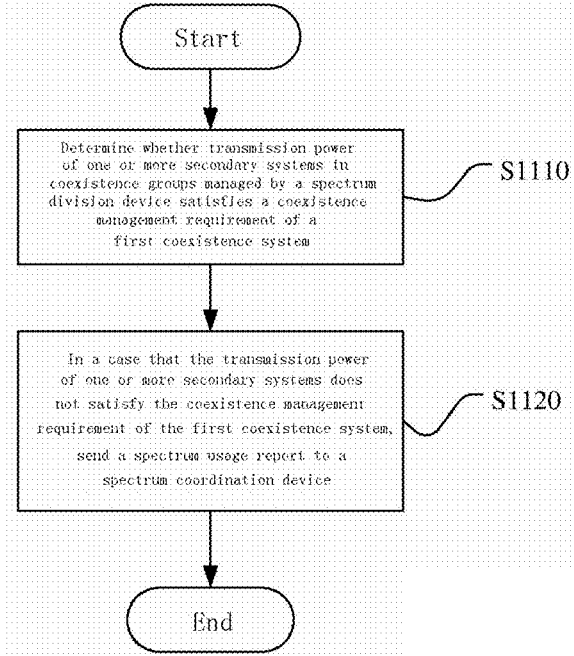
FIG. 11 is a flowchart showing a wireless communication method performed by a spectrum division device according to an embodiment of the present disclosure.

FIG. 11 is a flowchart showing a wireless communication method performed by a spectrum division device 400 in a wireless communication system according to an embodiment of the present disclosure.

As shown in FIG. 11, in step S1110, it is determined whether transmission power of one or more secondary systems in coexistence groups managed by a spectrum division device satisfies a coexistence management requirement of a first coexistence system.

Next, in step S1120, in a case that the transmission power of one or more secondary systems does not satisfy the coexistence management requirement of the first coexistence system, a spectrum usage report is sent to a spectrum coordination device.

Preferably, the wireless communication method further includes: determining, in a case where the transmission power of the one or more secondary systems is less than a predetermined threshold, that the coexistence management requirement of the first coexistence system is not satisfied.

Preferably, the wireless communication method further includes: generating the spectrum usage report, to include frequency band information on one or more secondary systems which do not satisfy the coexistence management requirement of the first coexistence system.

Preferably, the wireless communication method further includes: receiving spectrum modification information from the spectrum coordination device; and allocating, according to the spectrum modification information, spectrum sources to one or more secondary systems in coexistence groups managed by the spectrum division device, to allocate, to a secondary system in the coexistence groups, frequency bands in usable spectrum resources of the first coexistence system which satisfy the coexistence management requirement.

According to an embodiment of the present disclosure, the above method may be performed by the spectrum division device 400 according to the embodiment of the present disclosure. Therefore, all embodiments of the spectrum division device 400 described above are suitable for this embodiment.

Next, a wireless communication method performed by a spectrum authorization device 500 in a wireless communication system according to an embodiment of the present disclosure is described in detail. The wireless communication system includes a first coexistence system and a second coexistence system. The first coexistence system includes a spectrum coordination device and one or more secondary systems, and the second coexistence system includes a spectrum authorization device and one or more secondary systems.

Figure 12:
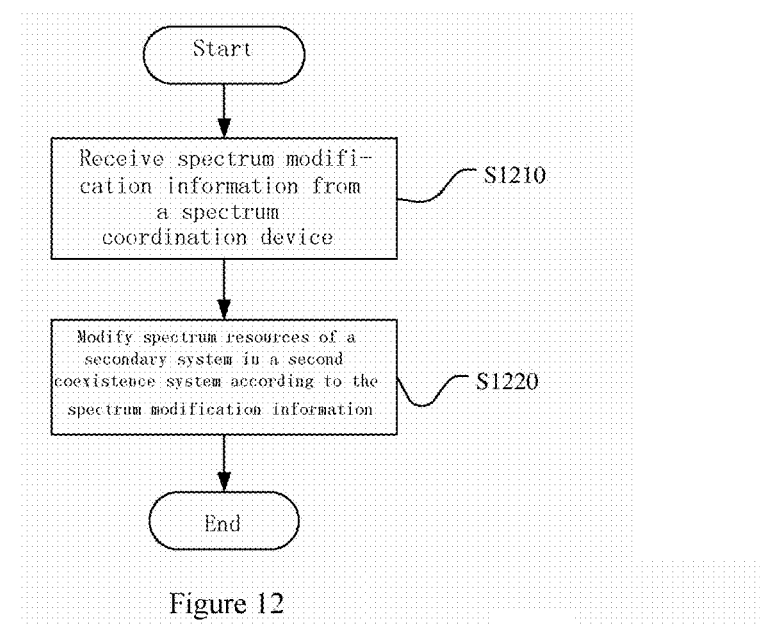
FIG. 12 is a flowchart showing a wireless communication method performed by a spectrum authorization device according to an embodiment of the present disclosure.

FIG. 12 is a flowchart showing a wireless communication method performed by a spectrum authorization device 500 in a wireless communication system according to an embodiment of the present disclosure.

As shown in FIG. 12, in step S1210, spectrum modification information is received from a spectrum coordination device.

Next, in step S1220, spectrum resources of a secondary system in a second coexistence system are modified according to the spectrum modification information.

Preferably, the wireless communication method further includes: modifying, according to the spectrum modification information, the spectrum resources of the secondary system in the second coexistence system, to allocate, to the secondary system in the second coexistence system, frequency bands in usable spectrum resources of the second coexistence system except frequency bands which do not satisfy a coexistence management requirement of the first coexistence system.

According to an embodiment of the present disclosure, the above method may be performed by the spectrum authorization device 500 according to the embodiment of the present disclosure. Therefore, all embodiments of the spectrum authorization device 500 described above are suitable for this embodiment.

7. Application Example

The technology according to the present disclosure may be applied to various products For example, the spectrum coordination device 300, the spectrum division device 400 and the spectrum authorization device 500 may be realized as any type of server such as a tower server, a rack server, and a blade server. The spectrum coordination device 300, the spectrum division device 400 and the spectrum authorization device 500 may be a control module (such as an integrated circuit module including a single die, and a card or a blade that is inserted into a slot of a blade server) mounted on a server.

Figure 13:
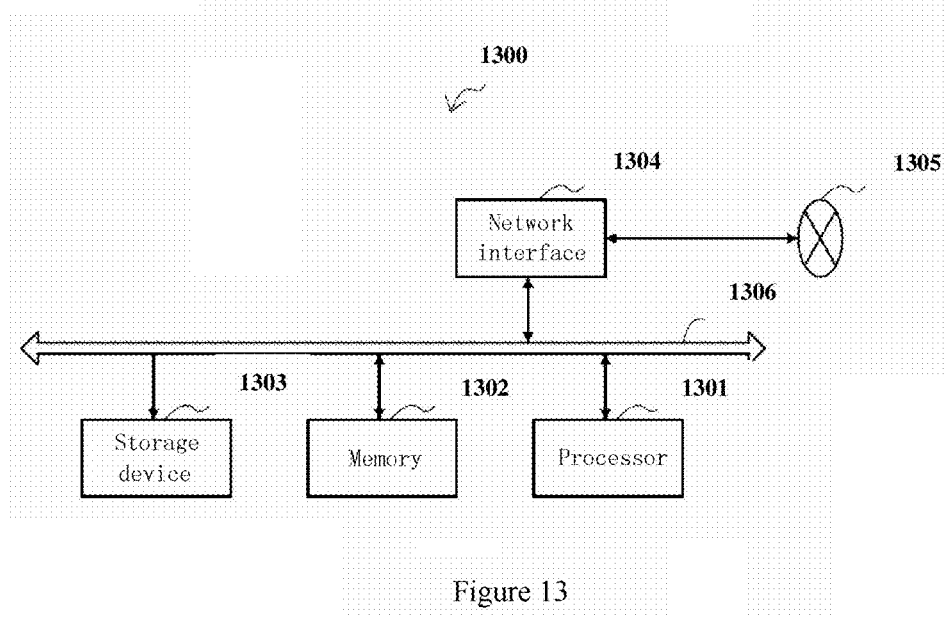
FIG. 13 is a block diagram showing an example of a server which may implement a spectrum coordination device, a spectrum division device and a spectrum authorization device according to the present disclosure.

FIG. 13 is a block diagram showing an example of a server 1300 which may implement a spectrum coordination device 300, a spectrum division device 400 and a spectrum authorization device 500 according to the present disclosure. The server 1300 includes a processor 1301, a memory 1302, a storage device 1303, a network interface 1304, and a bus 1306.

The processor 1301 may be, for example, a central processing unit (CPU) or a digital signal processor (DSP), and controls functions of the server 1300. The memory 1302 includes a random access memory (RAM) and a read only memory (ROM), and stores a program that is executed by the processor 1301 and data. The storage device 1303 may include a memory medium, such as a semiconductor memory and a hard disc.

The network interface 1304 is a wired communication interface for connecting the server 1300 to a wired communication network 1305. The wired communication network 1305 may be a core network such as an evolved packet core (EPC), or a packet data network (PDN) such as the Internet.

The bus 1306 connects the processor 1301, the memory 1302, the storage device 1303, and the network interface 1304 to each other. The bus 1306 may include two or more buses (such as a high speed bus and a low speed bus) each of which has different speed.

In the server 1300 shown in FIG. 13, the coordination unit 310 and the determination unit 330 described in FIG. 3, the determination unit 410, the generation unit 430, and the division unit 440 described in FIG. 4, as well as the authorization unit 520 described in FIG. 5 may be implemented by the processor 1301, and the communication unit 320 described in FIG. 3, the communication unit 420 described in FIG. 4 and the communication unit 510 described in FIG. 5 may be implemented by the network interface 1304. For example, the processor 1301 may execute the functions of determining usable spectrum resources, determining whether the coexistence management requirement of the coexistence system is satisfied and generating a spectrum usage report by executing instructions stored in the memory 1302 or the storage device 1303.

Preferred embodiments of the present disclosure are described above with reference to the accompanying drawings. However, the present disclosure is not limited to the above examples. Those skilled in the art can make various changes and modifications within the scope of the appended claims, and it should be understood that such changes and modifications naturally fall within the technical scope of the present disclosure.

For example, units shown by a dotted line block in the functional block diagram shown in the drawings indicate that the functional units are optional in the corresponding device, and the optional functional units may be combined appropriately to achieve the required function.

For example, multiple functions implemented by one unit in the above embodiments may be implemented by separate devices. Alternately, in above embodiments, multiple functions implemented by multiple units may be implemented by separate device. In addition, one of above functions may be implemented by multiple units. Needless to say, such a configuration is included in the technical scope of the present disclosure.

In this specification, the steps described in the flowchart include not only processing performed in the order in time series, but also include processing parallel or individually and not necessarily performed in time series. Furthermore, the steps performed in time series may be performed in other order appropriately.

Although the embodiments of the present disclosure have been described above in detail in connection with the drawings, it is appreciated that the embodiments as described above are merely illustrative but not limitative of the present disclosure. Those skilled in the art can make various modifications and changes to the above embodiments without departing from the spirit and scope of the present disclosure. Therefore, the scope of the present disclosure is defined only by the appended claims and their equivalents.

The invention claimed is:

1. A spectrum coordination device in a wireless communication system, comprising:
processing circuitry configured to
receive spectrum resource request from a spectrum division device in a first coexistence system that includes the spectrum coordination device and one or more secondary systems divided into coexistence groups, the wireless communication system comprising the first coexistence system and a second coexistence system comprising one or more secondary systems,
determine whether a coexistence management requirement of the first coexistence system is satisfied, and
generate, in a case where the coexistence management requirement of the first coexistence system is not satisfied, spectrum modification information for modifying spectrum resource of at least one of the secondary systems in the first coexistence system and/or for modifying spectrum resource of at least one of the secondary systems in the second coexistence system to maximize continuity of the spectrum resources of the first coexistence system.

2. The spectrum coordination device according to claim 1, wherein the processing circuitry is further configured to:
receive a spectrum usage report from the spectrum division device; and
determine, according to the spectrum usage report, whether the coexistence management requirement of the first coexistence system is satisfied.

3. The spectrum coordination device according to claim 2, wherein the processing circuitry is further configured to:
determine, according to the spectrum usage report, frequency band which does not satisfy the coexistence management requirement of the first coexistence system.

4. The spectrum coordination device according to claim 1, wherein the processing circuitry is further configured to:
determine a consecutive usage period of time of usable spectrum resources of the first coexistence system; and
determine, in a case where a consecutive usage period-of-time requirement with respect to frequency bands of one coexistence group is not satisfied, that the coexistence management requirement of the first coexistence system is not satisfied.

5. The spectrum coordination device according to claim 1, wherein the processing circuitry is further configured to:
send the spectrum modification information for modifying the spectrum resource of the at least one of the secondary systems in the first coexistence system to the spectrum division device of the first coexistence system.

6. The spectrum coordination device according to claim 5, wherein the spectrum modification information for modifying the spectrum resource of the at least one of the secondary systems in the first coexistence system comprises: allocating, to the coexistence groups in the first coexistence system, frequency bands in the usable spectrum resources of the first coexistence system which satisfy the coexistence management requirement.

7. The spectrum coordination device according to claim 1, wherein the second coexistence system further comprises a second spectrum authorization device for determining usable spectrum resources of the second coexistence system, and
wherein the processing circuitry is further configured to:
send the spectrum modification information for modifying the spectrum resource of the at least one of the secondary systems in the second coexistence system to the second spectrum authorization device.

8. The spectrum coordination device according to claim 7, wherein the spectrum modification information for modifying the spectrum resource of the at least one of the secondary systems in the second coexistence system comprises: allocating, to the secondary systems in the second coexistence system, frequency bands in the usable spectrum resources of the second coexistence system except the frequency bands which do not satisfy the coexistence management requirement.

9. The spectrum coordination device according to claim 8, wherein the spectrum modification information for modifying the spectrum resource of the at least one of the secondary systems in the first coexistence system comprises:
allocating, to the secondary systems in the second coexistence system, frequency bands in the usable spectrum resources of the second coexistence system locate at edges of the frequency bands,
allocating, to the coexistence groups in the first coexistence system, frequency bands in the usable spectrum resources of the first coexistence system except the frequency bands allocated to the secondary systems in the second coexistence system so that consecutive frequency bands are allocated to the coexistence groups in the first coexistence system.

10. The spectrum coordination device according to claim 1, wherein the first coexistence system further comprises a first spectrum authorization device for determining usable spectrum resources of the first coexistence system, and
wherein the processing circuitry is further configured to:
allocate spectrum resources to one or more coexistence groups in the first coexistence system according to the usable spectrum resources of the first coexistence system.

11. The spectrum coordination device according to claim 1, wherein the spectrum coordination device is a general authorized access spectrum coordination GSC device and the secondary system is a citizen broadband radio service device CB SD.

12. A spectrum division device in a wireless communication system, comprising:
processing circuitry configured to send spectrum resource request to a spectrum coordination device in a first coexistence system that includes the spectrum division device and one or more secondary systems divided into coexistence groups, the wireless communication system comprising the first coexistence system and a second coexistence system comprising one or more secondary systems,
determine whether transmission power of the one or more secondary systems in the coexistence groups managed by the spectrum division device satisfies a coexistence management requirement of the first coexistence systems, and
send, in a case where the transmission power of the one or more secondary systems do not satisfy the coexistence management requirement of the first coexistence system, a spectrum usage report to the spectrum coordination device, the spectrum coordination device generating spectrum modification information for modifying spectrum resource of at least one of the secondary systems in the first coexistence system and/or for modifying spectrum resource of at least one of the secondary systems in the second coexistence system to maximize continuity of the spectrum resources of the first coexistence system.

13. The spectrum division device according to claim 12, wherein the processing circuitry is further configured to:
determine, in a case where the transmission power of the one or more secondary systems is less than a predetermined threshold, that the coexistence management requirement of the first coexistence system is not satisfied.

14. The spectrum division device according to claim 12, wherein the processing circuitry is further configured to:
generate the spectrum usage report, to comprise frequency band information on one or more secondary systems which do not satisfy the coexistence management requirement of the first coexistence system.

15. The spectrum division device according to claim 14, wherein the processing circuitry is further configured to:

receive spectrum modification information from the spectrum coordination device; and
allocate, according to the spectrum modification information, spectrum sources to one or more secondary systems in coexistence groups managed by the spectrum division device, to allocate, to a secondary system in the coexistence groups, frequency bands in usable spectrum resources of the first coexistence system which satisfy the coexistence management requirement.

16. The spectrum division device according to claim 12, wherein the spectrum division device is a coexistence manager C×M, and the secondary system is a citizen broadband radio service device CBSD.

17. A wireless communication method performed by a spectrum coordination device in a wireless communication system, comprising:
receiving spectrum resource request from a spectrum division device in a first coexistence system that includes the spectrum coordination device and one or more secondary systems divided into coexistence groups, the wireless communication system comprising the first coexistence system and a second coexistence system comprising one or more secondary systems,
determining whether a coexistence management requirement of the first coexistence system is satisfied; and
generating, in a case where the coexistence management requirement of the first coexistence system is not satisfied, spectrum modification information for modifying spectrum resource of at least one of the secondary systems in the first coexistence system and/or for modifying spectrum resource of at least one of the secondary systems in the second coexistence system to maximize continuity of the spectrum resources of the first coexistence system.

18. The wireless communication method according to claim 17, further comprises:
receiving a spectrum usage report from the spectrum division device; and
determining, according to the spectrum usage report, whether the coexistence management requirement of the first coexistence system is satisfied.

19. The wireless communication method according to claim 18, wherein the wireless communication method further comprises:
determining, according to the spectrum usage report, frequency band which does not satisfy the coexistence management requirement of the first coexistence system.

20. The wireless communication method according to claim 17, wherein the wireless communication method further comprises:
determining a consecutive usage period of time of usable spectrum resources of the first coexistence system; and
determining, in a case where a consecutive usage period-of-time requirement with respect to frequency bands of one coexistence group is not satisfied, that the coexistence management requirement of the first coexistence system is not satisfied.

\* \* \* \* \*